(12) United States Patent
Ota et al.

(10) Patent No.: US 12,466,914 B2
(45) Date of Patent: Nov. 11, 2025

(54) RETARDATION FILM AND APPLICATIONS THEREOF

(71) Applicant: Osaka Gas Chemicals Co., Ltd., Osaka (JP)

(72) Inventors: Yoshiya Ota, Osaka (JP); Shinichi Kamei, Osaka (JP); Nagayoshi Masuda, Osaka (JP)

(73) Assignee: OSAKA GAS CHEMICALS CO., LTD., Osaka (JP)

( * ) Notice: Subject to any disclaimer, the term of this patent is extended or adjusted under 35 U.S.C. 154(b) by 762 days.

(21) Appl. No.: 17/789,018

(22) PCT Filed: Dec. 24, 2020

(86) PCT No.: PCT/JP2020/048351
§ 371 (c)(1),
(2) Date: Jun. 24, 2022

(87) PCT Pub. No.: WO2021/140927
PCT Pub. Date: Jul. 15, 2021

(65) Prior Publication Data
US 2023/0091159 A1    Mar. 23, 2023

(30) Foreign Application Priority Data

Jan. 8, 2020    (JP) ................................ 2020-001626

(51) Int. Cl.

| | |
|---|---|
| C08G 63/185 | (2006.01) |
| B32B 27/08 | (2006.01) |
| B32B 27/34 | (2006.01) |
| B32B 27/36 | (2006.01) |
| C08L 67/00 | (2006.01) |
| C08L 77/00 | (2006.01) |
| G02B 1/04 | (2006.01) |
| G02B 5/30 | (2006.01) |
| G02F 1/13363 | (2006.01) |
| H10K 59/80 | (2023.01) |

(52) U.S. Cl.
CPC ............ *C08G 63/185* (2013.01); *B32B 27/08* (2013.01); *B32B 27/34* (2013.01); *B32B 27/36* (2013.01); *C08L 67/00* (2013.01); *C08L 77/00* (2013.01); *G02B 1/04* (2013.01); *G02B 5/3083* (2013.01); *B32B 2250/24* (2013.01); *B32B 2307/514* (2013.01); *B32B 2307/518* (2013.01); *B32B 2307/732* (2013.01); *B32B 2457/20* (2013.01); *G02F 1/13363* (2013.01); *G02F 2413/12* (2013.01); *H10K 59/8791* (2023.02)

(58) Field of Classification Search
CPC .......... C08L 67/00; C08L 67/02; C08L 77/00; C08L 77/06; G02B 5/3083; G02B 5/3091
See application file for complete search history.

(56) References Cited

U.S. PATENT DOCUMENTS

| | | |
|---|---|---|
| 2011/0288261 A1 | 11/2011 | Motoyoshi et al. |
| 2012/0308796 A1 | 12/2012 | Tanaka et al. |
| 2015/0293286 A1 | 10/2015 | Jeon et al. |
| 2016/0291373 A1 | 10/2016 | Iida |

FOREIGN PATENT DOCUMENTS

| | | |
|---|---|---|
| JP | 2007-193045 | 8/2007 |
| JP | 2010-134232 | 6/2010 |
| JP | 2011-137861 | 7/2011 |
| JP | 2012-31369 | 2/2012 |

(Continued)

OTHER PUBLICATIONS

JP 2017-198956 Machine Translation (Year: 2017).*

(Continued)

*Primary Examiner* — Zachary M Davis
(74) *Attorney, Agent, or Firm* — Wenderoth, Lind & Ponack, L.L.P.

(57) ABSTRACT

A retardation film includes a polyester-series resin exhibiting a negative orientation birefringence and a forward wavelength dispersibility in retardation in combination with a polyamide-series resin exhibiting a positive orientation birefringence and a flat dispersibility in retardation. The polyester-series resin may contain a constitutional unit having a fluorene-9,9-diyl group, and the polyamide-series resin may contain a constitutional unit having an alicyclic skeleton. The polyester-series resin may contain at least one constitutional unit selected from a fluorenedicarboxylic acid unit (A1) containing a unit of the formula (1) and a fluorenediol unit (B1) containing a unit of the formula (2):

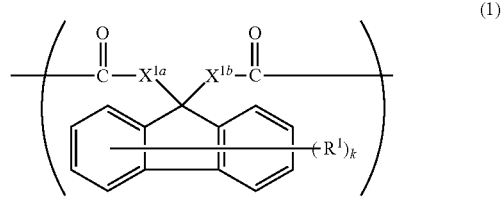

(1)

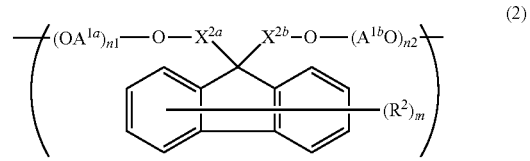

(2)

wherein $R^1$ and $R^2$ each represent a substituent; k and m each denote an integer of 0 to 8; $X^{1a}$, $X^{1b}$, $X^{2a}$, and $X^{2b}$ each represent a hydrocarbon group; $A^{1a}$ and $A^{1b}$ each represent an alkylene group; n1 and n2 each denote an integer of not less than 0. The retardation film has both a high retardation expression and a reciprocal wavelength dispersibility.

18 Claims, No Drawings

(56) References Cited

FOREIGN PATENT DOCUMENTS

| | | |
|---|---|---|
| JP | 2016-501384 | 1/2016 |
| JP | 2016-191900 | 11/2016 |
| JP | 2017-198956 | 11/2017 |
| JP | 2018-151627 | 9/2018 |
| KR | 10-2015-0037440 | 4/2015 |
| KR | 10-2015-0108263 | 9/2015 |
| KR | 10-2016-0038271 | 4/2016 |

OTHER PUBLICATIONS

KR 2016-0038271 Machine Translation (Year: 2016).*
International Search Report (ISR) issued Mar. 16, 2021 in International (PCT) Application No. PCT/JP2020/048351.
Japanese Office Action issued Mar. 29, 2022 in corresponding Japanese Patent Application No. 2021-569830 together with English translation thereof.
Japanese Office Action issued May 24, 2022 in corresponding Japanese Patent Application No. 2021-569830 together with English translation thereof.
International Preliminary Report on Patentability and Written Opinion of the International Searching Authority issued Jul. 12, 2022 in International (PCT) Application No. PCT/JP2020/048351.

* cited by examiner

RETARDATION FILM AND APPLICATIONS THEREOF

TECHNICAL FIELD

The present disclosure relates to a retardation film and an application thereof.

BACKGROUND ART

Various retardation films are used in image display devices loaded into, for example, televisions and smart phones, according to the types or others of the image display devices.

For example, in image display devices such as reflective liquid crystal display devices, semi-transmissive liquid crystal display devices, touch screen displays, and organic electroluminescent (EL) displays, circularly polarizing plates are used for the purpose of displaying images under control of polarization states or enhancing the visibility of the images by absorbing reflected lights, wherein such a circularly polarizing plate is formed of a ¼ wave plate and a polarizing plate (a linear polarizing plate) which are pasted (or laminated) in such a way that the absorption axis of the polarizing plate has an angle of 45° with respect to the slow axis of the ¼ wave plate. In particular, the organic EL displays are increasingly used in not only smart phones but also televisions, and circularly polarizing plates having an excellent wavelength dispersibility in a wide band range are increasing in importance also with the need of prevented external light reflection and enhanced visibility and contrast ratio. Specifically, in an organic EL display, a circularly polarizing plate absorbs a reflected light to prevent light leakage, so that the displayed image can be prevented from bluish coloring to improve in visibility and can also be prevented from insufficient black display due to the bluish coloring, and the contrast ratio can also be improved by sufficient black display. Thus, in a case where the circularly polarizing plate is free from a retardation film (a wide-band ¼ wave plate) which exhibits a reciprocal wavelength dispersibility having a retardation of substantially ¼ wavelength in a wide visible light region, the polarizing plate may decrease the visibility or the contrast ratio due to a leakage of a reflected light having a specific wavelength.

General-purpose polymers often exhibit a forward wavelength dispersibility in which the retardation is smaller as the wavelength is longer, or a flat dispersibility in which the retardation does not change much. A limited number of polymers exhibit a reciprocal wavelength dispersibility in which the retardation is larger as the wavelength is longer. Films of the polymers exhibiting such a reciprocal wavelength dispersibility are developed, and the films include a film of a polyester-series resin including a copolycarbonate or a copolyester; and the polyester-series resin contains a constitutional unit having a cardo structure in which an aromatic ring of the main chain is perpendicular to an aromatic ring of the side chain, that is, a 9,9-bisphenylfluorene skeleton, and a constitutional unit having an isosorbide ring or a cyclohexane ring. The films are adopted for circularly polarizing plates (Patent Documents 1 to 3).

Meanwhile, a large-size liquid crystal display (LCD), in particular, a liquid crystal television, also desires a retardation film exhibiting a reciprocal wavelength dispersibility. The liquid crystal television includes a vertical alignment liquid crystal display (VA-LCD) system and an in plane switching liquid crystal display (IPS-LCD) system. Among these two systems, the VA-LCD, which has a high front contrast and a very wide viewing angle in the vertical and horizontal directions, is the mainstream. In the VA system, it is difficult to achieve a high contrast viewing angle in the diagonal direction, and a retardation film is placed between the liquid crystal cell and each of the polarizing plates placed above and below the liquid crystal cell to achieve the viewing angle in the diagonal direction.

In the retardation film for the VA-LCD, a reciprocal wavelength dispersibility is very important from the viewpoint of compensating for retardation (or compensating for viewing angle) in the entire visible light region. In particular, it is said to be effective in preventing color shifts, in which color changes with changes in viewing angle. As a material for such a retardation film for the VA-LCD, there is used a cellulose acetate propionate (CAP), which can impart a reciprocal wavelength dispersibility by an additive.

However, in recent years, liquid crystal panels are increasingly transported by an open cell system to television set makers in simple packaging, and moisture absorption of the CAP during transportation brings issues in the image display function. Thus, instead of the CAP having a high water absorption, a cyclic olefinic (or cycloolefin-series) copolymer (COP) is increasingly adopted, while the COP fails to effectively prevent color shifts.

CITATION LIST

Patent Literature

Patent Document 1: JP 2010-134232 A
Patent Document 2: JP 2012-31369 A
Patent Document 3: JP 2018-151627 A

SUMMARY OF INVENTION

Technical Problem

In recent years, the retardation film is also required to be thinned in order to make the display thinner or lighter. However, since the retardation (or phase difference) is proportional to the thickness of the film, birefringence needs to be adjusted high in order to make the film thinner while maintaining a desired retardation. Films exhibiting a reciprocal wavelength dispersibility described in Patent Documents 1 to 3 express retardation by a uniaxial stretching, while these films have a small intrinsic birefringence (or retardation expression). It is thus difficult to form a thin film having a desired retardation unless the stretching condition is tightened in order to increase the orientation birefringence. However, these polymers mainly have a rigid structure containing a cardo structure and a ring structure such as an isosorbide ring or a cyclohexane ring, and the resulting film is fragile and is easily broken by stretching. Thus, there is a limit to the strict stretching condition. In particular, it is extremely difficult to form a retardation film for a VA-LCD, since the retardation of the film is adjusted by a biaxial stretching of which the stretching condition is severer than that of a uniaxial stretching.

Moreover, even if the thin film can be formed by a stretching, the film is fragile and has an insufficient mechanical strength, so that the film may hardly be handled. In addition, the film may contract due to a residual stress under the severe stretching condition and may also have a low environmental reliability (heat resistance, water resistance (moisture resistance), dimensional stability to heat or water (moisture), and retardation stability to heat or water (moisture)). Thus, a thin and high-quality retardation film cannot be produced simply or efficiently.

Furthermore, a high retardation and a reciprocal wavelength dispersibility usually tend to have a trade-off relationship. That is, a film exhibiting a reciprocal wavelength dispersibility has a higher retardation as the stretching condition is severer, while the film easily changes the wavelength dispersibility toward a direction from a reciprocal dispersion to a forward dispersion (or a normal dispersion). Thus, it is not easy to satisfy a desired retardation and a desired reciprocal wavelength dispersibility at the same time by adjustment of the stretching condition. In particular, a film exhibiting a reciprocal wavelength dispersibility usually has a low retardation expression as described above, and thus it is further difficult to achieve both the retardation and the reciprocal wavelength dispersibility.

It is therefore an object of the present disclosure to provide a new retardation film exhibiting both a high retardation expression (or phase difference expression or retardation expressibility) and a reciprocal wavelength dispersibility (a reciprocal wavelength dispersibility in in-plane retardation Ro) and an application (or a use) thereof.

Solution to Problem

The inventors of the present invention made intensive studies to achieve the above object and finally found that a retardation film formed with a polyester-series resin exhibiting a negative orientation birefringence and a forward wavelength dispersibility in a single film in combination with a polyamide-series resin exhibiting a positive orientation birefringence and a flat dispersibility in a single film exhibits a high retardation expression and a reciprocal wavelength dispersibility. The present invention was accomplished based on the above findings.

That is, the retardation film (or phase different film) of the present disclosure contains a polyester-series resin exhibiting a negative orientation birefringence and exhibiting a forward wavelength dispersibility in retardation (or phase difference), and a polyamide-series resin exhibiting a positive orientation birefringence and exhibiting a flat dispersibility in retardation (or phase difference).

The polyester-series resin may contain a constitutional unit having a fluorene-9,9-diyl group, and the polyamide-series resin may contain a constitutional unit having an alicyclic skeleton. The polyester-series resin may contain, as the constitutional unit having a fluorene-9,9-diyl group, at least one constitutional unit selected from a fluorenedicarboxylic acid unit (A1) and a fluorenediol unit (B1), and the fluorenedicarboxylic acid unit (A1) may contain a dicarboxylic acid unit represented by the following formula (1), and the fluorenediol unit (B1) may contain a diol unit represented by the following formula (2):

[Chem. 1]

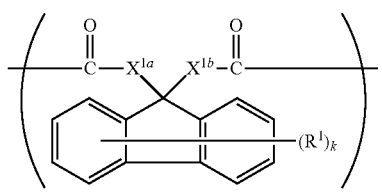

wherein $R^1$ represents a substituent, k denotes an integer of 0 to 8, $X^{1a}$ and $X^{1b}$ independently represent a divalent hydrocarbon group which may have a substituent,

[Chem. 2]

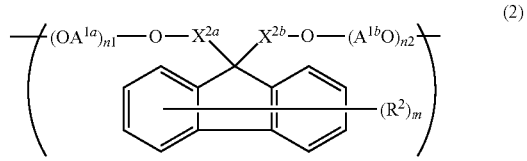

wherein $R^2$ represents a substituent, m denotes an integer of 0 to 8, $X^{2a}$ and $X^{2b}$ independently represent a divalent hydrocarbon group which may have a substituent, $A^{1a}$ and $A^{1b}$ independently represent a straight- or branched-chain alkylene group, and n1 and n2 each denote an integer of not less than 0.

The fluorenediol unit (B1) may contain a diol unit represented by the following formula (2A):

[Chem. 3]

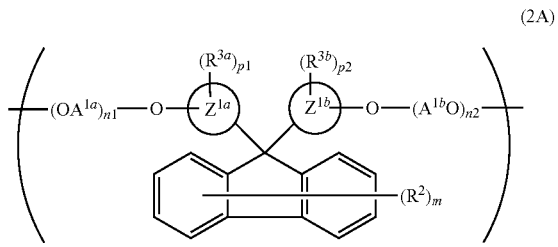

wherein $Z^{1a}$ and $Z^{1b}$ independently represent an arene ring, $R^{3a}$ and $R^{3b}$ independently represent a substituent, p1 and p2 independently denote an integer of not less than 0, and $R^2$, m, $A^{1a}$ and $A^{1b}$, n1 and n2 each have the same meaning as defined in the formula (2).

The polyester-series resin may contain a (poly)alkylene glycol unit (B2) represented by the following formula (3):

[Chem. 4]

wherein $A^2$ represents a straight- or branched-chain alkylene group, and q denotes an integer of not less than 1.

In the polyester-series resin, $X^{1a}$ and $X^{1b}$ each may represent a straight- or branched-chain $C_{2-4}$alkylene group in the formula (1), $Z^{1a}$ and $Z^{1b}$ each may represent a $C_{6-12}$arene ring, $R^{3a}$ and $R^{3b}$ each may represent a $C_{1-4}$alkyl group or a $C_{6-10}$aryl group, p1 and p2 each may denote an integer of 0 to 2, $A^{1a}$ and $A^{1b}$ each may represent a straight- or branched-chain $C_{2-4}$alkylene group, and n1 and n2 each denote an integer of 0 to 2 in the formula (2A), and $A^2$ may represent a straight- or branched-chain $C_{2-4}$alkylene group, and q may denote an integer of 1 to 4 in the formula (3).

The polyamide-series resin may contain a diamine unit represented by the following formula (4):

[Chem. 5]

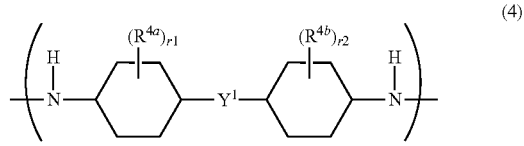

(4)

wherein $Y^1$ represents a direct bond, or a divalent hydrocarbon group which may have a substituent, $R^{4a}$ and $R^{4b}$ independently represent a substituent, r1 and r2 independently denote an integer of 0 to 4.

The polyamide-series resin may contain a constitutional unit (a dicarboxylic acid unit) derived from an aliphatic dicarboxylic acid component. The polyamide-series resin may contain a diamine unit represented by the formula (4) in which $Y^1$ represents a $C_{1-4}$alkylene group, $R^{4a}$ and $R^{4b}$ each represent a $C_{1-4}$alkyl group, and r1 and r2 each denote 0 or 1, and a constitutional unit (a dicarboxylic acid unit) derived from a straight- or branched-chain $C_{4-16}$alkanedicarboxylic acid component.

In the retardation film, the polyester-series resin and the polyamide-series resin may have a difference of about 0 to 20° C. in glass transition temperature. The retardation film may be a laminated film containing (or comprising) a first layer containing the polyester-series resin, and a second layer containing the polyamide-series resin. The retardation film may be a laminated film having a three-layer structure including the second layers laminated on both sides of the first layer, and may preferably be a laminated film having a three-layer structure including (or comprising) the first layers laminated on both sides of the second layer. In the retardation film, the ratio of the total thickness of the first layer(s) relative to the total thickness of the second layer(s) may be about 1/1 to 10/1 in terms of the former/the latter. The retardation film may have a thickness of about 20 to 70 μm.

The retardation film may be a uniaxially stretched film (or a uniaxially oriented film). The retardation film may be a film uniaxially stretched obliquely with respect to the longitudinal (or length) direction of the film, and the angle between the in-plane slow axis of the film and the longitudinal direction of the film may be about 40 to 50°. In the retardation film, Ro(550) may be about 100 to 160 nm and the ratio Ro(450)/Ro(550) may be about not less than 0.7 and less than 1, wherein Ro(λ) represents an in-plane retardation at a wavelength of λ nm. The retardation film may be a ¼ wave plate.

The retardation film may be a biaxially stretched film (or a biaxially oriented film). In the retardation film, the in-plane slow axis of the film may be substantially perpendicular, for example, about 85 to 95°, with respect to the longitudinal direction of the film. In the retardation film, Ro(550) may be about 30 to 50 nm, the ratio Ro(450)/Ro(550) may be about not less than 0.7 and less than 1, and Rth(589) may be about 120 to 140 nm, wherein Ro(λ) represents an in-plane retardation at a wavelength of λ nm, and Rth(λ) represents a thickness-direction retardation at a wavelength of λ nm. The retardation film may be an optical compensation film for a vertically aligned liquid crystal display.

The present disclosure also includes a polarizing plate containing the retardation film, and an image display device (or apparatus) containing the polarizing plate. The image display device may be an organic electroluminescent (EL) display or a vertically aligned liquid crystal display.

In this description and claims, the term "positive" of orientation birefringence (or orientation birefringence property) and intrinsic birefringence means a characteristic showing, in a film plane of an oriented polymer film (or uniaxially stretched film), a refractive index in the orientation direction (or stretching direction) larger than a refractive index in a direction perpendicular to the orientation direction. The term "negative" means a characteristic showing, in a film plane of an oriented polymer film (or uniaxially stretched film), a refractive index in the orientation direction smaller than a refractive index in a direction perpendicular to the orientation direction.

Regarding the wavelength dispersibility, in this description and claims, the term "forward wavelength dispersibility" or "forward dispersion (or normal dispersion)" means a characteristic showing a smaller absolute value of the in-plane retardation Ro as the wavelength is longer, particularly means that the ratio Ro(450)/Ro(550) at a measurement temperature of 20° C. is larger than 1.05; the term "reciprocal wavelength dispersibility (or reverse wavelength dispersibility)" or "reciprocal dispersion (or reverse dispersion)" means a characteristic showing a larger absolute value of the in-plane retardation Ro as the wavelength is longer, particularly means that the ratio Ro(450)/Ro(550) at a measurement temperature of 20° C. is less than 1; the term "flat dispersibility (or flat dispersion)" means a characteristic showing a substantially unchanged absolute value of the in-plane retardation Ro regardless of wavelengths, particularly means that the ratio Ro(450)/Ro(550) at a measurement temperature of 20° C. is 1 to 1.05.

In this description and claims, the term "diol unit" or "constitutional unit derived from a diol component" means a unit (or divalent group) represented by removing two hydrogen atoms from two hydroxyl groups of the corresponding diol component. The term "diol component" (including a compound as exemplified as a diol component) may be used synonymously with the corresponding "diol unit".

In the same way, the term "dicarboxylic acid unit" or "constitutional unit derived from a dicarboxylic acid component" means a unit (or divalent group) represented by removing two OH groups (hydroxyl groups) from two carboxyl groups of the corresponding dicarboxylic acid. The term "dicarboxylic acid component" (including a compound as exemplified as a dicarboxylic acid component) may be used synonymously with the corresponding "dicarboxylic acid unit".

In this description and claims, it is meant that the term "dicarboxylic acid component" includes a dicarboxylic acid, and in addition, an ester-forming derivative thereof, for example, a lower alkyl ester of a dicarboxylic acid, a dicarboxylic acid halide, and a dicarboxylic acid anhydride. The lower alkyl ester of the dicarboxylic acid may include, for example, a $C_{1-4}$alkyl ester such as methyl ester, ethyl ester, and t-butyl ester. Examples of the dicarboxylic acid halide may include a dicarboxylic acid chloride and a dicarboxylic acid bromide. The "ester-forming derivative" may be a monoester (half ester) or a diester.

The term "diamine unit" or "constitutional unit derived from a diamine component" means a unit (or a divalent group) represented by removing a hydrogen atom one by one from each of two amino groups of the corresponding diamine. The term "diamine component" (including a compound as exemplified as a diamine component) may be used synonymously with the corresponding "diamine unit".

In this description and claims, the number of carbon atoms in a substituent may be represented as $C_1$, $C_6$, $C_{10}$. For example, an alkyl group having one carbon atom is represented as "$C_1$alkyl group", and an aryl group having 6 to 10 carbon atoms is represented as "$C_{6-10}$aryl group".

Advantageous Effects of Invention

The retardation film of the present disclosure is formed with the polyester-series resin exhibiting a negative orientation birefringence and exhibiting a forward wavelength dispersibility in retardation in combination with the polyamide-series resin exhibiting a positive orientation birefringence and exhibiting a flat dispersibility in retardation, and the film achieves both a high retardation expression and an excellent (or suitable) reciprocal wavelength dispersibility. Thus, the retardation film easily maintains a desired retardation (or phase difference) even in the form of a thin film and has an excellent balance in thinness, retardation (or phase difference), and reciprocal wavelength dispersibility. Moreover, due to easy expression of retardation even under a relatively mild stretching condition, the film also has a high formability (or productivity) and an environmental reliability. In particular, the combination of the polyester-series resin containing the constitutional unit with the specific fluorene-9,9-diyl group and the polyamide-series resin containing the constitutional unit with the specific alicyclic skeleton enables preparation of a film with an excellent toughness (or softness or flexibility), and such a film has a further improved formability or handleability. Thus, a wideband ¼ wave plate, or a retardation film for a VA-LCD which can prevent color shifts is formable easily or efficiently.

DESCRIPTION OF EMBODIMENTS

In the present disclosure, a retardation film is formed with a specified polyester-series resin and a specified polyamide-series resin in combination.
[Polyester-Series Resin]

The polyester-series resin is a resin of which a single film (a uniaxially stretched film) exhibits a negative orientation birefringence and exhibits a forward wavelength dispersibility in retardation. From the viewpoint of easy preparation of a retardation film exhibiting an excellent reciprocal wavelength dispersibility, the forward wavelength dispersibility of the polyester-series resin is a forward wavelength dispersibility (a steep forward wavelength dispersibility) having a large amount of change in retardation (or phase difference) with respect to wavelengths; for example, the ratio Ro(450)/Ro(550) at a measurement temperature of 20° C. is about 1.1 to 1.3, preferably 1.12 to 1.25, and more preferably 1.15 to 1.2. The polyester-series resin may include, for example, a polyester resin, a polycarbonate resin, and a polyester-carbonate resin. These polyester-series resins may be contained alone or in combination of two or more. Among these polyester-series resins, the polyester resin is preferred from the viewpoint of formability, retardation expression, or other characteristics.

The polyester-series resin exhibiting the above-mentioned characteristics may include, for example, a polyester-series resin which contains a constitutional unit having a fluorene ring-containing group such as fluorene-9,9-diyl group (or fluorenylidene group) and 9-fluorenyl group, and preferably includes, for example, a polyester-series resin which contains a constitutional unit having fluorene-9,9-diyl group (a resin in which 9-position of a fluorene ring is positioned on a main chain and which has the fluorene ring as a side chain).

The polyester-series resin preferably contains a dicarboxylic acid component (A) and a diol component (B) as polymerization components. The constitutional unit having a fluorene ring-containing group may be a unit derived from either one of the polymerization components. It is preferred that at least the dicarboxylic acid unit (A) have a dicarboxylic acid unit (A1) having a fluorene ring-containing group (hereinafter, which may be referred to as a fluorenedicarboxylic acid unit). In particular, it is preferred that both the dicarboxylic acid unit (A) and the diol unit (B) have a constitutional unit having a fluorene ring-containing group.
(Dicarboxylic Acid Unit (A))

Fluorenedicarboxylic acid unit (A1) The fluorenedicarboxylic acid unit (A1) may include, for example, a dicarboxylic acid unit represented by the following formula (1):

[Chem. 6]

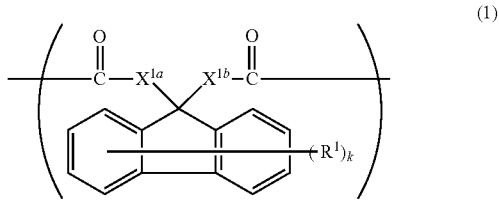

wherein $R^1$ represents a substituent, k denotes an integer of 0 to 8, $X^{1a}$ and $X^{1b}$ independently represent a divalent hydrocarbon group which may have a substituent.

In the formula (1), the divalent hydrocarbon group in $X^{1a}$ and $X^{1b}$ may be a divalent aromatic hydrocarbon group such as phenylene group; the divalent hydrocarbon group is preferably a divalent alicyclic hydrocarbon group such as cyclohexylene group and a divalent aliphatic hydrocarbon group, and particularly preferably a divalent aliphatic hydrocarbon group. In a case where $X^{1a}$ and $X^{1b}$ forming a main chain are divalent alicyclic or aliphatic hydrocarbon groups, a combination of these groups with a fluorene ring structure (fluorene-9,9-diyl group) as a side chain provides a small wavelength dependence of a refractive index in the main chain direction and a large wavelength dependence of a refractive index in a direction perpendicular to the main chain direction. Thus, this allows easy production of a polyester-series resin exhibiting a negative orientation birefringence and exhibiting a forward wavelength dispersibility with a large wavelength dependence. In particular, when $X^{1a}$ and $X^{1b}$ are divalent aliphatic hydrocarbon groups, the polyester-series resin has a high retardation expression, which enables stretching under a milder (or gentler) stretching condition. Furthermore, such $X^{1a}$ and $X^{1b}$ impart an increased toughness (softness or flexibility) to the polyester-series resin to form a film being hardly broken and having excellent formability and handleability, or such $X^{1a}$ and $X^{1b}$ reduce thermal contraction or others caused by residual stress. Thus, it is preferred in forming a thinner retardation film.

The divalent aliphatic hydrocarbon group represented by the groups $X^{1a}$ and $X^{1b}$ may be a straight- or branched-chain alkylene group, a straight- or branched-chain alkynylene group, and other groups. The divalent aliphatic hydrocarbon group is preferably a straight- or branched-chain alkylene group. Examples of the straight- or branched-chain alkylene group may include a straight- or branched-chain $C_{1-8}$alkylene group such as methylene group, ethylene group, trimethylene group, propylene group, 1,2-butanediyl group, and 2-methylpropane-1,3-diyl group. Among these groups, a preferred one is a straight- or branched-chain $C_{1-6}$alkylene group, a more preferred one is a straight- or branched-chain $C_{1-4}$alkylene group, and further preferred one is a straight- or branched-chain $C_{2-4}$alkylene group. Among them, a straight- or branched-chain $C_{2-3}$alkylene group such as ethylene group and propylene group is preferred, and ethylene group is particularly preferred. The groups $X^{1a}$ and $X^{1b}$ may be different from each other, and the same groups are preferred.

The optional substituent of the divalent hydrocarbon group represented by $X^{1a}$ and $X^{1b}$ may include may include, for example, an aryl group such as phenyl group, and a cycloalkyl group such as cyclohexyl group. The number of the substituents is not particularly limited to a specific one and is, for example, 0 to 10, preferably 0 to 2, further preferably 0 or 1, and particularly 0. The divalent hydrocarbon group having the substituent may be, for example, 1-phenylethylene group and 1-phenylpropane-1,2-diyl group. It is preferred that $X^{1a}$ and $X^{1b}$ be a straight- or branched-chain alkylene group having no substituent.

In the formula (1), the group $R^1$ may be a non-polymerizable group or non-reactive substituent inactive to polymerization reaction, and may include, for example, a cyano group; a halogen atom such as a fluorine atom, a chlorine atom, and a bromine atom; and a hydrocarbon group such as an alkyl group and an aryl group. Examples of the aryl group may include a $C_{6-10}$aryl group such as phenyl group. A preferred group $R^1$ includes the cyano group, the halogen atom, and the alkyl group, particularly the alkyl group.

The alkyl group may include, for example, a $C_{1-12}$alkyl group such as methyl group, ethyl group, n-propyl group, isopropyl group, n-butyl group, and t-butyl group, preferably a $C_{1-8}$alkyl group, and particularly a $C_{1-4}$alkyl group such as methyl group.

In a case where the number k of the substituents $R^1$ denotes two or more, the species of two or more groups $R^1$ on one of two benzene rings constituting the fluorene ring may be the same or different from each other, or the species of two or more groups $R^1$ on different benzene rings may be the same or different from each other. The bonding position(s) (substitution position(s)) of the group(s) $R^1$ may include, but should not be limited to, for example, 2-position, 7-position, and 2,7-positions of the fluorene ring.

The number k of the substituents may denote, for example, an integer of about 0 to 6. A preferred range of the number k is an integer of 0 to 4, an integer of 0 to 3, and an integer of 0 to 2 in a stepwise manner; the number k is preferably 0 or 1 and particularly preferably 0. The numbers of the substituents $R^1$ on two respective benzene rings constituting the fluorene ring may be different from each other, and the same numbers are preferred.

Representative examples of the dicarboxylic acid unit represented by the formula (1) may include a constitutional unit in which $X^{1a}$ and $X^{1b}$ each represent a straight- or branched-chain $C_{2-6}$alkylene group, for example, a constitutional unit derived from a 9,9-bis(carboxy$C_{2-6}$alkyl)fluorene such as 9,9-bis(2-carboxyethyl)fluorene and 9,9-bis(2-carboxypropyl)fluorene. These dicarboxylic acid units represented by the formula (1) may be used alone or in combination of two or more. Among these dicarboxylic acid units represented by the formula (1), it is preferred to contain a constitutional unit derived from preferably a 9,9-bis(carboxy$C_{2-6}$alkyl)fluorene, further preferably a 9,9-bis(carboxy$C_{2-4}$alkyl)fluorene, and particularly a 9,9-bis(carboxy$C_{2-3}$alkyl)fluorene such as 9,9-bis(2-carboxyethyl)fluorene and 9,9-bis(2-carboxypropyl)fluorene.

The fluorenedicarboxylic acid units (A1) may be used alone or in combination of two or more. The proportion of the dicarboxylic acid unit represented by the formula (1) relative to the total fluorenedicarboxylic acid units (A1) may be selected from a range of, for example, not less than 1% by mol, specifically about 10 to 100% by mol. A preferred range of the proportion is not less than 30% by mol, not less than 50% by mol, not less than 60% by mol, not less than 70% by mol, not less than 80% by mol, not less than 90% by mol, and not less than 95% by mol in a stepwise manner. In particular, it is preferred that the proportion be 100% by mol, specifically, the fluorenedicarboxylic acid unit (A1) substantially contain only the dicarboxylic acid unit represented by the formula (1). In a case where the proportion of the dicarboxylic acid unit represented by the formula (1) is excessively low, it may be difficult to form (or produce) a polyester-series resin exhibiting a negative orientation birefringence and a forward wavelength dispersibility.

Among the dicarboxylic acid units represented by the formula (1), the proportion of the constitutional unit in which $X^{1a}$ and $X^{1b}$ are a straight- or branched-chain alkylene group, in particular, a straight- or branched-chain $C_{2-6}$alkylene group, relative to the total dicarboxylic acid units represented by the formula (1) may be selected from a range of, for example, not less than 1% by mol, specifically about 10 to 100% by mol. A preferred range of the proportion is not less than 30% by mol, not less than 50% by mol, not less than 60% by mol, not less than 70% by mol, not less than 80% by mol, not less than 90% by mol, and not less than 95% by mol in a stepwise manner. In particular, it is preferred that the proportion be 100% by mol, specifically, the dicarboxylic acid unit represented by the formula (1) substantially contain only the constitutional unit in which $X^{1a}$ and $X^{1b}$ are a straight- or branched-chain alkylene group, in particular, a straight- or branched-chain $C_{2-6}$alkylene group. In a case where the proportion of the constitutional unit in which $X^{1a}$ and $X^{1b}$ are a straight- or branched-chain alkylene group, in particular, a straight- or branched-chain $C_{2-6}$alkylene group, is excessively low, it may be difficult to form a polyester-series resin exhibiting a negative orientation birefringence and a forward wavelength dispersibility, and it may be difficult to form a thinner retardation film.

Second Dicarboxylic Acid Unit (A2)

The polyester-series resin may not contain a dicarboxylic acid unit (a second dicarboxylic acid unit (A2)) different from the fluorenedicarboxylic acid unit (or a first dicarboxylic acid unit) (A1) as the dicarboxylic acid unit (A), or may contain the second dicarboxylic acid unit (A2) if necessary in the scope that the effects of the present disclosure are not damaged.

The second dicarboxylic acid unit (A2) may include a constitutional unit derived from, for example, an aromatic dicarboxylic acid component [provided that the fluorenedicarboxylic acid component (A1) is excluded], an alicyclic dicarboxylic acid component, and an aliphatic dicarboxylic acid component.

The aromatic dicarboxylic acid component may include, for example, a benzenedicarboxylic acid, an alkylbenzenedicarboxylic acid, a polycyclic arenedicarboxylic acid, a diarylalkanedicarboxylic acid, a diarylketonedicarboxylic acid, and ester-forming derivatives of the compounds mentioned above.

Examples of the benzenedicarboxylic acid may include phthalic acid, isophthalic acid, and terephthalic acid.

The alkylbenzenedicarboxylic acid may include, for example, a $C_{1-4}$alkyl-benzenedicarboxylic acid such as 4-methylisophthalic acid and 5-methylisophthalic acid.

As the polycyclic arenedicarboxylic acid, for example, there may be mentioned a condensed polycyclic arenedicarboxylic acid and a ring-assemblies or ring-assembled arenedicarboxylic acid.

The condensed (or fused) polycyclic arenedicarboxylic acid may include, for example, a condensed polycyclic $C_{10-24}$arene-dicarboxylic acid, e.g., a naphthalenedicarboxylic acid such as 1,2-naphthalenedicarboxylic acid, 1,4-naphthalenedicarboxylic acid, 1,5-naphthalenedicarboxylic acid, 1,8-naphthalenedicarboxylic acid, 2,3-naphthalenedicarboxylic acid, and 2,6-naphthalenedicarboxylic acid; an anthracenedicarboxylic acid; and a phenanthrenedicarboxylic acid, preferably a condensed polycyclic $C_{10-14}$arenedicarboxylic acid.

Examples of the ring-assemblies arenedicarboxylic acid may include a bi$C_{6-10}$arene-dicarboxylic acid such as 2,2'-biphenyldicarboxylic acid, 3,3'-biphenyldicarboxylic acid, and 4,4'-biphenyldicarboxylic acid.

The diarylalkanedicarboxylic acid may include, for example, a di$C_{6-10}$aryl$C_{1-6}$alkane-dicarboxylic acid such as 4,4'-diphenylmethanedicarboxylic acid.

As the diarylketonedicarboxylic acid, for example, there may be mentioned a di($C_{6-10}$aryl)ketone-dicarboxylic acid such as 4,4'-diphenylketonedicarboxylic acid.

The alicyclic dicarboxylic acid component may include, for example, a cycloalkanedicarboxylic acid, a bridged (or cross-linked) cyclic cycloalkanedicarboxylic acid, a cycloalkenedicarboxylic acid, a bridged (or cross-linked) cyclic cycloalkenedicarboxylic acid, and ester-forming derivatives of the compounds mentioned above.

Examples of the cycloalkanedicarboxylic acid may include a $C_{5-10}$cycloalkane-dicarboxylic acid such as 1,4-cyclohexanedicarboxylic acid.

The bridged cyclic cycloalkanedicarboxylic acid may include, for example, a di- or tri-cycloalkanedicarboxylic acid such as decalindicarboxylic acid, norbornanedicarboxylic acid, adamantanedicarboxylic acid, and tricyclodecanedicarboxylic acid.

As the cycloalkenedicarboxylic acid, for example, there may be mentioned a $C_{5-10}$cycloalkenedicarboxylic acid such as cyclohexenedicarboxylic acid.

The bridged cyclic cycloalkenedicarboxylic acid may include, for example, a di- or tri-cycloalkenedicarboxylic acid such as norbornenedicarboxylic acid.

Examples of the aliphatic dicarboxylic acid component may include an alkanedicarboxylic acid, an unsaturated aliphatic dicarboxylic acid, and ester-forming derivatives of the compounds mentioned above.

The alkanedicarboxylic acid may include, for example, a $C_{2-12}$alkane-dicarboxylic acid such as succinic acid, adipic acid, sebacic acid, and decanedicarboxylic acid.

As the unsaturated aliphatic dicarboxylic acid, for example, there may be mentioned a $C_{2-10}$alkene-dicarboxylic acid such as maleic acid, fumaric acid, and itaconic acid.

These second dicarboxylic acid units (A2) may be used alone or in combination of two or more.

The proportion of the fluorenedicarboxylic acid unit (A1) relative to the total dicarboxylic acid units (A) may be selected from a range of, for example, not less than 1% by mol, specifically about 10 to 100% by mol. A preferred range of the proportion is not less than 30% by mol, not less than 50% by mol, not less than 60% by mol, not less than 70% by mol, not less than 80% by mol, not less than 90% by mol, and not less than 95% by mol in a stepwise manner. In particular, it is preferred that the proportion be 100% by mol, specifically, the dicarboxylic acid units (A) be substantially free from the second dicarboxylic acid unit (A2). In a case where the proportion of the fluorenedicarboxylic acid unit (A1) is excessively low, it may be difficult to form a polyester-series resin exhibiting a negative orientation birefringence and a forward wavelength dispersibility.

(Diol Unit (B))

In the polyester-series resin, the diol unit (B) preferably has a diol unit (B1) having a fluorene ring-containing group (hereinafter, which may be referred to as a fluorenediol unit).

Fluorenediol Unit (B1)

The fluorenediol unit (B1) may include, for example, a diol unit represented by the following formula (2):

[Chem. 7]

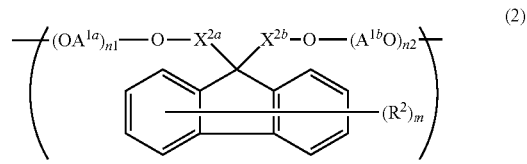

wherein $R^2$ represents a substituent, m denotes an integer of 0 to 8, $X^{2a}$ and $X^{2b}$ independently represent a divalent hydrocarbon group which may have a substituent, $A^{1a}$ and $A^{1b}$ independently represent a straight- or branched-chain alkylene group, n1 and n2 each denote an integer of not less than 0.

In the formula (2), the substituent represented by $R^2$ and the number m of the substituents, including preferred embodiments of the concrete examples of the substituents, the number range of the substituents, and the substitution position, are the same as the substituent represented by $R^1$ and the number k of the substituents in the formula (1), respectively.

In $X^{2a}$ and $X^{2b}$, the divalent hydrocarbon group may include, as with $X^{1a}$ and $X^{1b}$ in the formula (1), for example, a divalent aliphatic hydrocarbon group such as a straight- or branched-chain alkylene group, a divalent alicyclic hydrocarbon group such as cyclohexylene group, and a divalent aromatic hydrocarbon group such as phenylene group. A preferred divalent hydrocarbon group includes a divalent aliphatic hydrocarbon group and a divalent aromatic hydrocarbon group.

In $X^{2a}$ and $X^{2b}$, the optional substituent of the divalent hydrocarbon group may be a non-reactive group or non-polymerizable substituent inactive to polymerization reaction, and may include, for example, a halogen atom, a hydrocarbon group (or a group [—$R^h$]), a group [—$OR^h$] (wherein $R^h$ represents the above-mentioned hydrocarbon group), a group [—$SR^h$] (wherein $R^h$ represents the above-mentioned hydrocarbon group), an acyl group, a nitro group, a cyano group, and a mono- or di-substituted amino group.

The halogen atom may include, for example, a fluorine atom, a chlorine atom, a bromine atom, and an iodine atom.

The hydrocarbon group represented by the above $R^h$ may include, for example, an alkyl group, a cycloalkyl group, an aryl group, and an aralkyl group.

The alkyl group may include, for example, a straight- or branched-chain $C_{1-10}$alkyl group such as methyl group, ethyl group, propyl group, isopropyl group, n-butyl group, isobutyl group, s-butyl group, and t-butyl group, and is preferably a straight- or branched-chain $C_{1-6}$alkyl group, and more preferably a straight- or branched-chain $C_{1-4}$alkyl group.

Examples of the cycloalkyl group may include a $C_{5-10}$cycloalkyl group such as cyclopentyl group and cyclohexyl group.

The aryl group may include, for example, a $C_{6-12}$alkyl group such as phenyl group, an alkylphenyl group, biphenylyl group, and naphthyl group. Examples of the alkylphenyl group may include a mono- to tri-$C_{1-4}$alkyl-phenyl group such as methylphenyl group (or tolyl group) and dimethylphenyl group (or xylyl group).

The aralkyl group may include, for example, a $C_{6-10}$aryl-$C_{1-4}$alkyl group such as benzyl group and phenethyl group.

The above-mentioned group [—$OR^h$] may include, for example, an alkoxy group, a cycloalkyloxy group, an aryloxy group, and an aralkyloxy group.

Specifically, the group [—$OR^h$] may include a group corresponding to the above-exemplified hydrocarbon group $R^h$. Examples of the alkoxy group may include a straight- or branched-chain $C_{1-10}$alkoxy group such as methoxy group, ethoxy group, propoxy group, n-butoxy group, isobutoxy group, and t-butoxy group. Examples of the cycloalkyloxy group may include a $C_{5-10}$cycloalkyloxy group such as cyclohexyloxy group. Examples of the aryloxy group may include a $C_{6-10}$aryloxy group such as phenoxy group. Examples of the aralkyloxy group may include a $C_{6-10}$aryl-$C_{1-4}$alkyloxy group such as benzyloxy group.

The above-mentioned group [—$SR^h$] may include, for example, an alkylthio group, a cycloalkylthio group, an arylthio group, and an aralkylthio group. Specifically, the group [—$SR^h$] may include a group corresponding to the above-exemplified hydrocarbon group $R^h$. Examples of the alkylthio group may include a $C_{1-10}$alkylthio group such as methylthio group, ethylthio group, propylthio group, n-butylthio group, and t-butylthio group. Examples of the cycloalkylthio group may include a $C_{5-10}$cycloalkylthio group such as cyclohexylthio group. Examples of the arylthio group may include a $C_{6-10}$arylthio group such as thiophenoxy group. Examples of the aralkylthio group may include a $C_{6-10}$aryl-$C_{1-4}$alkylthio group such as benzylthio group.

Examples of the acyl group may include a $C_{1-6}$alkylcarbonyl group such as acetyl group.

The mono- or di-substituted amino group may include, for example, a dialkylamino group and a bis(alkylcarbonyl)amino group. As the dialkylamino group, for example, there may be mentioned a di$C_{1-4}$alkylamino group such as dimethylamino group. The bis(alkylcarbonyl)amino group may include, for example, a bis($C_{1-4}$alkyl-carbonyl)amino group such as diacetylamino group.

In $X^{2a}$ and $X^{2b}$, the number of the optional substituents of the divalent hydrocarbon group may be selected from a range of, for example, about 0 to 10, and is preferably 0 to 2, more preferably 0 or 1, and particularly 0.

The species of $X^{2a}$ and $X^{2b}$ may be different from each other, and the same species are preferred.

The alkylene groups $A^{1a}$ and $A^{1b}$ may include, for example, a straight- or branched-chain $C_{2-6}$alkylene group such as ethylene group, propylene group (1,2-propanediyl group), trimethylene group, 1,2-butanediyl group, and tetramethylene group. In a case where the repeating number n1 or n2 is not less than 1, the alkylene group includes preferably a straight- or branched-chain $C_{2-4}$alkylene group, further preferably a straight- or branched-chain $C_{2-3}$alkylene group such as ethylene group and propylene group, and particularly preferably ethylene group.

The repeating numbers (added mole numbers) n1 and n2 of oxyalkylene groups (—$OA^{1a}$-) and (—$OA^{1b}$-) are each not less than 0 and may be selected from an integer range of, for example, about 0 to 15. A preferred range of each repeating number is 0 to 10, 0 to 8, 0 to 6, 0 to 4, 0 to 2, and 0 to 1 in a stepwise manner. In a case where $X^{2a}$ and $X^{2b}$ are a divalent aliphatic hydrocarbon group such as a straight- or branched-chain alkylene group, the repeating number n1 or n2 is preferably 0. As the after-described formula (2A), in a case where $X^{2a}$ and $X^{2b}$ are a divalent aromatic hydrocarbon group, the repeating numbers n1 and n2 are each preferably not less than 1 in view of improving the polymerization reactivity, and, for example, each may be selected from an integer range of about 1 to 15; a preferred range of each repeating number is 1 to 10, 1 to 8, 1 to 6, 1 to 4, 1 to 3, and 1 to 2 in a stepwise manner; in particular, each of the repeating numbers is preferably 1. In this description and claims, the term "repeating number (added mole number)" may be an average (arithmetic average, arithmetical average) or an average addition molar amount (an average number of moles added), and preferred embodiments (ranges) of the average are the same as those of the above-mentioned preferred ranges (the above-mentioned integer ranges). An excessively large repeating number n1 and/or n2 may lead to decrease in refractive index or heat resistance.

The two repeating numbers n1 and n2 may be the same or different from each other. In a case where n1 or n2 denote 2 or more, the species of the two or more oxyalkylene groups (—$OA^{1a}$-) or (—$OA^{1b}$-) may be the same or different from each other. The species of the (poly)oxyalkylene groups (—$OA^{1a}$-)$_{n1}$ and (—$OA^{1b}$-)$_{n2}$, which are boned to $X^{2a}$ and $X^{2b}$, respectively, through an ether bond (—O—), may be the same or different from each other.

Representative examples of the diol unit represented by the formula (2) may include a diol unit (B1-1) in which $X^{2a}$ and $X^{2b}$ are a straight- or branched-chain alkylene group (hereinafter, may simply be referred to as a bisalkylfluorenediol unit) and a diol unit (B1-2) represented by the after-mentioned formula (2A) (hereinafter, may simply be referred to as a bisarylfluorenediol unit). These fluorenediol units (B1) may be used alone or in combination of two or more.

Bisalkylfluorenediol Unit (B1-1)

The bisalkylfluorenediol unit (B1-1) has $X^{2a}$ and $X^{2b}$ which are a straight- or branched-chain alkylene group that is an aliphatic hydrocarbon group, and, as with the case of the fluorenedicarboxylic acid unit represented by the formula (1), a combination of these groups with the fluorene ring structure (fluorene-9,9-diyl group) as the side chain provides a small wavelength dependence of a refractive index in the main chain direction and a large wavelength dependence of a refractive index of a direction perpendicular to the main chain direction. Thus, this allows easy production of a polyester-series resin exhibiting a negative orientation birefringence and exhibiting a forward wavelength dispersibility with a large wavelength dependence. Moreover, such a polyester-series resin not only enables stretching under a milder (or gentler) stretching condition due to a high retardation expression but also enables formation of a film being hardly to be broken and having excellent formability and handleability due to an increased toughness (softness or flexibility), or allows reduction of thermal contraction caused by residual stress; such a polyester-series resin is preferred in order to form a thinner retardation film.

In the bisalkylfluorenediol unit (B1-1), the straight- or branched-chain alkylene group $X^{2a}$ and $X^{2b}$ may include, for example, a straight- or branched-chain $C_{1-8}$alkylene group such as methylene group, ethylene group, trimethylene group, propylene group, 1,2-butanediyl group, and 2-methylpropane-1,3-diyl group. Among them, a straight- or branched-chain $C_{1-6}$alkylene group is preferred, a straight- or branched-chain $C_{1-4}$alkylene group is more preferred, a straight- or branched-chain $C_{1-3}$alkylene group is further preferred. In particular, a $C_{1-2}$alkylene group such as methylene group and ethylene group is preferred, and methylene group is particularly preferred. Among these alkylene groups, a straight-chain alkylene group is preferred to prevent a decrease in polymerization reactivity due to a secondary alcohol when n1 and/or n2 denotes 0.

Representative examples of the bisalkylfluorenediol unit (B1-1) may include a 9,9-bis(hydroxy-straight-chain or -branched-chain $C_{1-6}$alkyl)fluorene such as 9,9-bis(hydroxymethyl)fluorene, 9,9-bis(2-hydroxyethyl)fluorene, 9,9-bis(3-hydroxypropyl)fluorene, and 9,9-bis(4-hydroxybutyl)fluorene.

These bisalkylfluorenediol units (B1-1) may be used alone or in combination of two or more. A preferred bisalkylfluorenediol unit (B1-1) includes a 9,9-bis(hydroxy-straight-chain $C_{1-6}$alkyl)fluorene, more preferably a 9,9-bis(hydroxy-straight-chain $C_{1-4}$alkyl)fluorene, and further preferably 9,9-bis(hydroxy-straight-chain $C_{1-3}$alkyl)fluorene. Among them, a 9,9-bis(hydroxy-straight-chain $C_{1-2}$alkyl)fluorene is preferred, and 9,9-bis(hydroxymethyl)fluorene is particularly preferred.

Bisarylfluorenediol Unit (B1-2)

The bisarylfluorenediol unit (B1-2) represented by the following formula (2A) has an effect in which the cardo structure of the bisarylfluorenediol unit (B1-2) imparts a negative oriented birefringence and a forward dispersion with a large wavelength dependence (a steep forward wavelength dispersibility) to the polyester-series resin. The bisarylfluorenediol unit (B1-2) corresponds a unit represented by the formula (2) in which each of $X^{2a}$ and $X^{2b}$ is a divalent aromatic hydrocarbon group. The bisarylfluorenediol unit (B1-2) has a relatively large refractive index in the main chain direction and a relatively large wavelength dependence thereof; and, compared with the bisalkylfluorenediol unit (B1-1), may have a slightly low effect of adjustment to the above-mentioned optical characteristics (retardation expression and wavelength dispersibility) or may make the formability or handleability derived from the film toughness slightly low. However, since the bisarylfluorenediol unit (B1-2) easily increases the glass transition temperature of the polyester-series resin and thus reduces thermal contraction caused by residual stress to effectively improve an environmental reliability (heat resistance and water resistance (moisture resistance) as well as dimensional stability to heat or water (moisture), and retardation stability to heat or water (moisture)), the bisarylfluorenediol unit (B1-2) is preferred more than the bisalkylfluorenediol unit (B1-1). Specifically, the bisarylfluorenediol unit (B1-2) is effective in adjusting a balance between the environmental reliability and the retardation expression and wavelength dispersibility. Thus, the bisarylfluorenediol unit (B1-2) is preferably combined with the fluorenedicarboxylic acid unit represented by the formula (1) and/or the bisalkylfluorenediol unit (B1-1), and is further preferably combined with at least the fluorenedicarboxylic acid unit represented by the formula (1).

[Chem. 8]

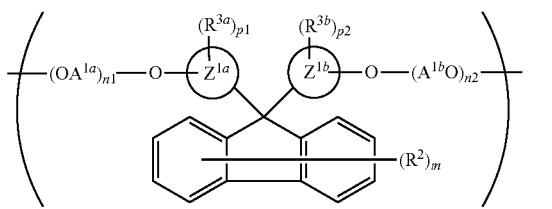

(2A)

In the formula, $Z^{1a}$ and $Z^{1b}$ independently represent an arene ring, $R^{3a}$ and $R^{3b}$ independently represent a substituent, p1 and p2 independently denote an integer of not less than 0, $R^2$, m, $A^{1a}$ and $A^{1b}$, n1 and n2, including preferred embodiments, each have the same meaning as defined in the formula (2).

In the formula (2A), the arene ring (aromatic hydrocarbon ring) represented by $Z^{1a}$ and $Z^{1b}$ may include, for example, a monocyclic arene ring such as a benzene ring, and a polycyclic arene ring. Examples of the polycyclic arene ring may include a condensed polycyclic arene ring (a condensed polycyclic aromatic hydrocarbon ring) and a ring-assemblies arene ring or ring-assembled arene ring (a ring-assemblies polycyclic aromatic hydrocarbon ring).

The condensed (or fused) polycyclic arene ring may include, for example, a condensed bi- to tetra-cyclic arene ring such as a condensed bicyclic arene ring and a condensed tricyclic arene ring. Examples of the condensed bicyclic arene ring may include a condensed bicyclic $C_{10-16}$arene ring such as a naphthalene ring and an indene ring. The condensed tricyclic arene ring may include, for example, a condensed tricyclic $C_{14-20}$arene ring such as an anthracene ring and a phenanthrene ring. A preferred condensed polycyclic arene ring includes a condensed polycyclic $C_{10-14}$arene ring such as a naphthalene ring.

The ring-assemblies arene ring may include, for example, a biarene ring such as biphenyl ring, phenylnaphthalene ring, and binaphthyl ring; and a terarene ring such as terphenyl ring. A preferred ring-assemblies arene ring includes a $C_{12-18}$biarene ring such as biphenyl ring.

In this description and claims, the term "ring-assemblies (or ring-aggregated) arene ring" means an arene ring which has two or more ring-system (arene ring-system) directly connected by a single bond or a double bond, and has one smaller number of bonds directly connected to each ring-system than the number of the ring-system. As mentioned above, for example, a biarene ring such as a biphenyl ring, a phenylnaphthalene ring, and a binaphthyl ring is classified into a ring-assemblies arene ring even having a condensed polycyclic arene ring skeleton such as a naphthalene ring skeleton. Therefore, the term "ring-assemblies arene ring" is clearly distinguished from the term "condensed polycyclic arene ring" such as a naphthalene ring (non-ring-assemblies arene ring).

Preferred rings $Z^{1a}$ and $Z^{1b}$ include a $C_{6-14}$arene ring, and are more preferably a $C_{6-12}$arene ring such as a benzene ring, a naphthalene ring, and a biphenyl ring, further preferably a $C_{6-10}$arene ring such as a benzene ring and a naphthalene ring, and particularly preferably a benzene ring.

The species of the rings $Z^1$ and $Z^2$ may be different from each other, and the same species are preferred. The substitution positions of the rings $Z^{1a}$ and $Z^{1b}$ bonded at the 9-position of the fluorene ring are not particularly limited to specific positions. For example, in a case where the ring $Z^{1a}$ is a benzene ring, the substitution positions may be any position; in a case where the ring $Z^{1a}$ is a naphthalene ring, the substitution positions are any position of 1-position or 2-position, preferably 2-position; in a case where the ring $Z^{1a}$ is a biphenyl ring, the substitution positions are any position of 2-position, 3-position, and 4-position, preferably 3-position. The same also applies to the ring $Z^{1b}$.

The substituents represented by $R^{3a}$ and $R^{3b}$ may include the substituents exemplified as the optional substituent of the divalent hydrocarbon group in $X^{2a}$ and $X^{2b}$ of the formula (2). Among these groups $R^{3a}$ and $R^{3b}$, representative groups may include, for example, a halogen atom; a hydrocarbon group such as an alkyl group, a cycloalkyl group, an aryl group, and an aralkyl group; an alkoxy group; an acyl group; a nitro group; a cyano group; and a substituted amino group. In a case where the number p1 and/or p2 of the substituents is not less than 1, a preferred $R^{3a}$ and/or $R^{3b}$ includes an alkyl group, a cycloalkyl group, an aryl group, and an alkoxy group, further preferably a straight- or branched-chain $C_{1-6}$alkyl group such as methyl group, a $C_{5-8}$cycloalkyl group such as cyclohexyl group, a $C_{6-14}$aryl group such as phenyl group, and a straight- or branched-chain $C_{1-4}$alkoxy group such as methoxy group. Among them, the alkyl group such as a straight- or branched-chain $C_{1-4}$alkyl group and the aryl group are preferred, a straight- or branched-chain $C_{1-3}$alkyl group and a $C_{6-10}$aryl group are more preferred, a $C_{1-2}$alkyl group such as methyl group and phenyl group are further preferred. In a case where the group $R^{3a}$ is an aryl group, the group $R^{3a}$ may form the above-mentioned ring-assemblies arene ring together with the ring $Z^{1a}$. The same relationship between $R^{3a}$ and $Z^{1a}$ also applies to $R^{3b}$ and $Z^{1b}$.

The numbers p1 and p2 of the substituents $R^{3a}$ and $R^{3b}$ are each an integer of not less than 0 and may suitably be selected according to the species of the rings $Z^{1a}$ and $Z^{1b}$. Each of the numbers may be, for example, an integer of about 0 to 8. A preferred range of each number is an integer of 0 to 4, an integer of 0 to 3, and an integer of 0 to 2 in a stepwise manner; each of the numbers is especially preferably 0 or 1, and particularly preferably 0.

The numbers p1 and p2 of the substituents may be different from each other, and the same numbers are preferred. In a case where the number p1 of the substituents is 2 or more, the species of the two or more groups $R^{3a}$ on the same ring $Z^{1a}$ may be the same or different from each other. The same relationship among p1, $Z^{1a}$, and $R^{3a}$ also applies to p2, $Z^{1b}$, and $R^{3b}$. The species of the groups $R^{3a}$ and $R^{3b}$ may be different from each other, and the same species are preferred. In particular, in a case where p1 denotes 1, the ring $Z^{1a}$ may be a benzene ring, a naphthalene ring, or a biphenyl ring, and the group $R^{3a}$ may be a methyl group. The same relationship among p1, $Z^{1a}$, and $R^{3a}$ also applies to p2, $Z^{1b}$, and $R^{3b}$. The substitution position(s) of the group(s) $R^{3a}$ is not particularly limited and are other than positions at which the ring $Z^{1a}$ is bonded to the 9-position of the fluorene ring and a group $[—O-(A^{1a}O)_{n1}-]$ (hereinafter, which may be referred to as an ether-containing group). In the ring $Z^{1a}$, the group $R^{3a}$ is preferably positioned at ortho position of the ether-containing group (or at the carbon atom adjacent to the bonding position of the ether-containing group). The same relationship among $R^{3a}$, $Z^{1a}$, and $[—O-(A^{1a}O)_{n1}-]$ also applies to $R^{3b}$, $Z^{1b}$, and $[—O-(A^{1b}O)_{n2}-]$.

The substitution position of the group $[—O-(A^{1a}O)_{n1}—]$ on the ring $Z^{1a}$ is a suitable position on the ring $Z^{1a}$ without particular limitation. In a case where the ring $Z^{1a}$ is a benzene ring, the substitution position of the ether-containing group is preferably any of 2-position, 3-position, and 4-position of the phenyl group bonded to 9-position of the fluorene ring, especially either 3-position or 4-position, and particularly 4-position. In a case where the ring $Z^{1a}$ is a naphthalene ring, the substitution position of the ether-containing group is preferably any of 5- to 8-positions of the naphthyl group bonded to 9-position of the fluorene ring. For example, the ether-containing group and 9-position of the fluorene ring are preferably bonded to the naphthalene ring at a relationship of 1,5-position, 2,6-position, particularly 2,6-position, where 1-position or 2-position of the naphthalene ring is bonded to 9-position of the fluorene ring (the fluorene ring has 1-naphthyl or 2-naphthyl substituent). In a case where the ring $Z^{1a}$ is a ring-assemblies arene ring, the ring-assemblies arene ring may be substituted by the ether-containing group without particular limitation of substitution position, for example, an arene ring bonded to 9-position of the fluorene or an arene ring adjacent to the arene ring may be substituted by such a group. For example, in a case where the ring $Z^{1a}$ is a biphenyl ring (or the ring $Z^{1a}$ is a benzene ring, p1 denotes 1, and $R^{3a}$ is a phenyl group), 3-position or 4-position of the biphenyl ring may be bonded to 9-position of the fluorene. In a case where 3-position of the biphenyl ring is bonded to 9-position of the fluorene, the substitution position of the ether-containing group may be, for example, any of 2-position, 4-position, 5-position, 6-position, 2'-position, 3'-position, and 4'-position of the biphenyl ring, and is preferably any of 6-position or 4'-position, and is particularly preferably 6-position. The same relationship among $[—O-(A^{1a}O)_{n1}—]$, $Z^{1a}$, p1, and $R^{3a}$ also applies to the group $[—O-(A^{1b}O)_{n2}—]$, $Z^{1b}$, p2, and $R^{3b}$.

Representative examples of the bisarylfluorenediol unit (B1-2) may include a diol unit corresponding to the 9,9-bis (hydroxyaryl)fluorenes represented by the formula (2A) wherein n1 and n2 denotes 0; and a diol unit corresponding to the 9,9-bis[hydroxy(poly)alkoxyaryl]fluorenes represented by the formula (2A) wherein n1 and n2 each denote not less than 1, for example, about 1 to 10. In this description and claims, the term "(poly)alkoxy" is used to mean both alkoxy group and polyalkoxy group unless otherwise noted.

The 9,9-bis(hydroxyaryl)fluorenes may include, for example, a 9,9-bis(hydroxyphenyl)fluorene, a 9,9-bis(alkyl-hydroxyphenyl)fluorene, a 9,9-bis(aryl-hydroxyphenyl) fluorene, and a 9,9-bis(hydroxynaphthyl)fluorene.

Examples of the 9,9-bis(hydroxyphenyl)fluorene may include 9,9-bis(4-hydroxyphenyl)fluorene.

The 9,9-bis(alkyl-hydroxyphenyl)fluorene may include, for example, a 9,9-bis[(mono- or di-)$C_{1-4}$alkyl-hydroxyphenyl]fluorene such as 9,9-bis(4-hydroxy-3-methylphenyl) fluorene, 9,9-bis(4-hydroxy-3-isopropylphenyl)fluorene, and 9,9-bis(4-hydroxy-3,5-dimethylphenyl)fluorene.

As the 9,9-bis(aryl-hydroxyphenyl)fluorene, for example, there may be mentioned a 9,9-bis($C_{6-10}$aryl-hydroxyphenyl) fluorene such as 9,9-bis(4-hydroxy-3-phenylphenyl)fluorene.

The 9,9-bis(hydroxynaphthyl)fluorene may include, for example, 9,9-bis(6-hydroxy-2-naphthyl)fluorene and 9,9-bis (5-hydroxy-1-naphthyl)fluorene.

Examples of the 9,9-bis[hydroxy(poly)alkoxyaryl]fluorenes may include a 9,9-bis[hydroxy(poly)alkoxyphenyl] fluorene, a 9,9-bis[alkyl-hydroxy(poly)alkoxyphenyl]fluorene, a 9,9-bis[aryl-hydroxy(poly)alkoxyphenyl]fluorene, and a 9,9-bis[hydroxy(poly)alkoxynaphthyl]fluorene.

The 9,9-bis[hydroxy(poly)alkoxyphenyl]fluorene may include, for example, a 9,9-bis[hydroxy(mono- to deca-)$C_{2-4}$alkoxy-phenyl]fluorene such as 9,9-bis[4-(2-hydroxyethoxy)phenyl]fluorene, 9,9-bis[4-(2-(2-hydroxyethoxy) ethoxy)phenyl]fluorene, and 9,9-bis[4-(2-hydroxypropoxy) phenyl]fluorene.

As the 9,9-bis[alkyl-hydroxy(poly)alkoxyphenyl]fluorene, for example, there may be mentioned a 9,9-bis[(mono- or di-)$C_{1-4}$alkyl-hydroxy(mono- to deca-)$C_{2-4}$alkoxy-phenyl]fluorene such as 9,9-bis[4-(2-hydroxyethoxy)-3-methylphenyl]fluorene, 9,9-bis[4-(2-(2-hydroxyethoxy)ethoxy)-3-methylphenyl]fluorene, 9,9-bis[4-(2-hydroxyethoxy)-3,5-dimethylphenyl]fluorene, and 9,9-bis[4-(2-hydroxypropoxy)-3-methylphenyl]fluorene.

The 9,9-bis[aryl-hydroxy(poly)alkoxyphenyl]fluorene may include, for example, a 9,9-bis[$C_{6-10}$aryl-hydroxy(mono- to deca-)$C_{2-4}$alkoxy-phenyl]fluorene such as 9,9-bis(4-(2-hydroxyethoxy)-3-phenylphenyl)fluorene, 9,9-bis[4-(2-(2-hydroxyethoxy)ethoxy)-3-phenylphenyl]fluorene, and 9,9-bis(4-(2-hydroxypropoxy)-3-phenylphenyl)fluorene.

Examples of the 9,9-bis[hydroxy(poly)alkoxynaphthyl]fluorene may include a 9,9-bis[hydroxy(mono- to deca-)$C_{2-4}$alkoxynaphthyl]fluorene such as 9,9-bis[6-(2-hydroxyethoxy)-2-naphthyl]fluorene, 9,9-bis[5-(2-hydroxyethoxy)-1-naphthyl]fluorene, 9,9-bis[6-(2-(2-hydroxyethoxy)ethoxy)-2-naphthyl]fluorene, and 9,9-bis[6-(2-hydroxypropoxy)-2-naphthyl]fluorene.

The bisarylfluorenediol unit (B1-2) may be used alone or in combination of two or more. Among the bisarylfluorenediol units (B1-2), a preferred unit includes a constitutional unit derived from:

9,9-bis[hydroxy(poly)alkoxyaryl]fluorenes such as a 9,9-bis[hydroxy(mono- to hexa-)$C_{2-4}$alkoxy$C_{6-10}$aryl]fluorene, more preferably a 9,9-bis[hydroxy(mono- or di-)$C_{2-4}$alkoxy-$C_{6-10}$aryl]fluorene, further preferably a 9,9-bis[hydroxy$C_{2-3}$alkoxy-$C_{6-12}$aryl]fluorene such as 9,9-bis[4-(2-hydroxyethoxy)phenyl]fluorene, 9,9-bis[4-(2-hydroxyethoxy)-3-phenylphenyl]fluorene, 9,9-bis[6-(2-hydroxyethoxy)-2-naphthyl]fluorene, especially preferably a 9,9-bis[hydroxy$C_{2-3}$alkoxy-phenyl]fluorene such as 9,9-bis[4-(2-hydroxyethoxy)phenyl]fluorene.

In the fluorenediol unit (B1), the bisalkylfluorenediol unit (B1-1) and the bisarylfluorenediol unit (B1-2) may be used alone or in combination of two or more. The proportion of the total amount of the bisalkylfluorenediol unit (B1-1) and the bisarylfluorenediol unit (B1-2) relative to the total fluorenediol units (B1) may be selected from a range of, for example, not less than 1% by mol, specifically about 10 to 100% by mol. A preferred range of the proportion is not less than 30% by mol, not less than 50% by mol, not less than 60% by mol, not less than 70% by mol, not less than 80% by mol, not less than 90% by mol, and not less than 95% by mol in a stepwise manner. In particular, it is preferred that the proportion be 100% by mol, specifically, the fluorenediol unit (B1) substantially contain only the bisalkylfluorenediol unit (B1-1) and/or the bisarylfluorenediol unit (B1-2). In a case where the proportion is excessively low, it may be difficult to form a polyester-series resin exhibiting a negative orientation birefringence and a forward wavelength dispersibility. In order to satisfy the retardation expression and the wavelength dispersibility, and the environmental reliability in a well-balanced manner, it is preferred that the fluorenediol unit (B1) only contain the bisarylfluorenediol unit (B1-2).

The proportion of the fluorenediol unit (B1) relative to the total diol units (B) may be selected from a range of, for example, not less than 1% by mol, specifically about 10 to 100% by mol. A preferred range of the proportion is 30 to 100% by mol, 50 to 99% by mol, 60 to 98% by mol, 70 to 97% by mol, and 80 to 96% by mol in a stepwise manner; the proportion is particularly preferably 85 to 95% by mol. In a case where the proportion of the fluorenediol unit (B1) is excessively low, it may be difficult to form a polyester-series resin exhibiting a negative orientation birefringence and a forward wavelength dispersibility. In a case where the proportion is excessively high, the resulting polyester-series resin may have a low formability or a low handleability.

(Poly)Alkylene Glycol Unit (B2)

The polyester-series resin may contain a (poly)alkylene glycol unit (B2) represented by the following formula (3) as the diol unit (B), if necessary. Since the (poly)alkylene glycol unit (B2) contained in the diol unit (B) enables the polymerization reactivity of the polyester-series resin to be improved to increase the molecular weight or makes the chemical structure of the polyester-series resin soft or flexible to improve the toughness, the (poly)alkylene glycol unit (B2) is effective in preparing a retardation film having excellent formability and handleability. Thus, it is preferred to contain the (poly)alkylene glycol unit (B2) in combination with the bisarylfluorenediol unit (B1-2).

[Chem. 9]

$$-\!\!\left(\!O\!-\!(A^2O)_q\!\right)\!\!- \quad (3)$$

In the formula, $A^2$ represents a straight- or branched-chain alkylene group, and q denotes an integer of not less than 1.

In the formula (3), the alkylene group represented by $A^2$ may include, for example, a straight- or branched-chain $C_{2-12}$alkylene group such as ethylene group, propylene group, trimethylene group, 1,2-butanediyl group, 1,3-butanediyl group, tetramethylene group, 1,5-pentanediyl group, 1,6-hexanediyl group, 1,8-octanediyl group, and 1,10-decanediyl group. A preferred alkylene group $A^2$ includes a straight- or branched-chain $C_{2-10}$alkylene group, a straight- or branched-chain $C_{2-8}$alkylene group, a straight- or branched-chain $C_{2-6}$alkylene group, and a straight- or branched-chain $C_{2-4}$alkylene group, more preferably a straight- or branched-chain $C_{2-3}$alkylene group such as ethylene group and propylene group, and particularly preferably ethylene group in a stepwise manner.

The repeating number q may be selected from a range of, for example, about 1 to 10. A preferred range of the number is 1 to 8, 1 to 6, 1 to 4, 1 to 3, and 1 to 2 in a stepwise manner; the number is particularly preferably 1. The repeating number q may be an average (arithmetic average or arithmetical average), and preferred embodiments (ranges) of the average are the same as those of the above-mentioned integer ranges. In a case where q denotes 2 or more, the species of the two or more oxyalkylene groups (-$A^2O$—) may be different from each other, and the same species are preferred.

The diol component corresponding to the (poly)alkylene glycol unit (B2) may include, for example, an alkylene glycol (or an alkanediol) and a polyalkylene glycol (or a polyalkanediol).

Examples of the alkylene glycol may include a compound corresponding to the formula (3) in which q denotes 1 and $A^2$ represents the above-exemplified alkylene group. Specifically, such a compound may include a straight- or branched-chain $C_{2-12}$alkylene glycol such as ethylene glycol, propylene glycol, trimethylene glycol, 1,2-butanediol, 1,3-butanediol, tetramethylene glycol (or 1,4-butanediol), 1,5-pentanediol, neopentyl glycol, 1,6-hexanediol, 1,8-octanediol, and 1,10-decanediol. Preferred embodiments correspond to those of the alkylene group $A^2$.

Examples of the polyalkylene glycol may include a compound corresponding to the formula (3) in which q denotes not less than 2, for example, q denotes about 2 to 10, and $A^2$ represents the above-exemplified alkylene group. Specifically, such a compound may include, for example, a di- to deca-straight- or branched-chain $C_{2-12}$alkylene glycol such as diethylene glycol, dipropylene glycol, and triethylene glycol, preferably a di- to hexa-straight- or branched-chain $C_{2-6}$alkylene glycol, and further preferably a di- to tetra-straight- or branched-chain $C_{2-4}$alkylene glycol.

These (poly)alkylene glycol unit (B2) may be used alone or in combination of two or more. A preferred (poly)alkylene glycol unit (B2) includes a diol unit derived from the alkylene glycol in view of hardly reducing the heat resistance, and more preferably a diol unit derived from: a straight- or branched-chain $C_{2-6}$alkylene glycol, further preferably a straight- or branched-chain $C_{2-4}$alkylene glycol such as ethylene glycol, propylene glycol, and 1,4-butanediol, especially a straight- or branched-chain $C_{2-3}$alkylene glycol such as ethylene glycol and propylene glycol, and particularly ethylene glycol.

The proportion of the (poly)alkylene glycol unit (B2) relative to the total diol units (B) may be selected from a range of about 0 to 100% by mol, for example, about 1 to 50% by mol. A preferred range of the proportion is 3 to 30% by mol, 5 to 20% by mol, and 7 to 15% by mol in a stepwise manner; the proportion is particularly preferably 8 to 12% by mol. In a case where the proportion of the (poly)alkylene glycol unit (B2) is excessively high, it may be difficult to form a polyester-series resin exhibiting a negative orientation birefringence and a forward wavelength dispersibility. In a case where the proportion of the (poly)alkylene glycol unit (B2) is excessively low, the resulting polyester-series resin may have a low formability or a low handleability.

In a case where the fluorenediol unit (B1) and the (poly)alkylene glycol unit (B2) are contained in combination, the ratio B1/B2 (molar ratio) may be selected from a range of, for example, about 1/99 to 99/1. A preferred range of the ratio is 10/90 to 99/1, 30/70 to 99/1, 50/50 to 99/1, 60/40 to 98/2, 70/30 to 97/3, and 80/20 to 96/4 in a stepwise manner; the ratio is particularly preferably 85/15 to 95/5. In particular, in a case where the bisarylfluorenediol unit (B1-2) and the (poly)alkylene glycol unit (B2) are contained in combination, the ratio B1-2/B2 (molar ratio), including preferred embodiments, are the same as the ratio B1/B2 mentioned above. In a case where the proportion of the fluorenediol unit (B1) or the bisarylfluorenediol unit (B1-2) is excessively low, it may be difficult to form a polyester-series resin exhibiting a negative orientation birefringence and a forward wavelength dispersibility. In a case where the proportion is excessively high, the resulting polyester-series resin may have a low formability or a low handleability.

Third Diol Unit (B3)

The polyester-series resin may not contain a third diol unit (B3) different from the fluorenediol unit (or the first diol unit) (B1) and the (poly)alkylene glycol unit (or the second diol unit) (B2), as the diol unit (B). The diol unit (B) may contain the third diol unit (B3) if necessary in the scope that effects of the present disclosure are not damaged.

The third diol unit (B3) may include a constitutional unit derived from, for example, an alicyclic diol, an aromatic diol [provided that a diol corresponding to the fluorenediol unit (B1) is excluded], and an alkylene oxide (or alkylene carbonate, haloalkanol) adduct of such a diol component.

Examples of the alicyclic diol may include a cycloalkanediol such as cyclohexanediol; a bis(hydroxyalkyl)cycloalkane such as cyclohexane dimethanol; and a hydrogenated product of the after-mentioned aromatic diol such as a hydrogenated product of bisphenol A.

The aromatic diol may include, for example, a dihydroxyarene such as hydroquinone and resorcinol; an araliphatic diol such as benzene dimethanol; bisphenols such as bisphenol A, bisphenol F, bisphenol AD, bisphenol C, bisphenol G, and bisphenol S; and biphenols such as p,p'-biphenol.

The alkylene oxide (or corresponding alkylene carbonate, haloalkanol) adduct of such a diol component may include, for example, a $C_{2-4}$alkylene oxide adduct, preferably a $C_{2-3}$alkylene oxide adduct such as an ethylene oxide adduct and a propylene oxide adduct. The added mole number is not particularly limited to a specific one. Specifically, such a adduct may include an adduct in which about 2 to 10 mol of ethylene oxide is added to 1 mol of the diol such as bisphenol A.

The diol unit (B) may contain these third diol units (B3) alone or in combination of two or more.

The proportion of the total amount of the fluorenediol unit (B1) and the (poly)alkylene glycol unit (B2) relative to the total diol units (B) may be selected from a range of, for example, about not less than 1% by mol, specifically about 10 to 100% by mol. A preferred range of the proportion is not less than 30% by mol, not less than 50% by mol, not less than 60% by mol, not less than 70% by mol, not less than 80% by mol, not less than 90% by mol, and not less than 95% by mol in a stepwise manner. In particular, it is preferred that the proportion be 100% by mol, specifically, the diol unit (B) be substantially free from the third diol unit (B3).

The polyester-series resin preferably contains the fluorenedicarboxylic acid unit (A1) and the fluorenediol unit (B1) from the viewpoint of easy adjustment to specific orientation birefringence and wavelength dispersibility, and further preferably contains the fluorenedicarboxylic acid unit (A1), the bisarylfluorenediol unit (B1-2), and the (poly)alkylene glycol unit (B2).

In the polyester-series resin, the proportion of the constitutional unit having a fluorene ring-containing group, that is, the proportion of the total amount of the fluorenedicarboxylic acid unit (A1) and the fluorenediol unit (B1) relative to the total polyester constitutional units may be selected from a range of, for example, about not less than 10% by mol, specifically about 30 to 100% by mol. A preferred range of the proportion is 50 to 100% by mol, 60 to 100% by mol, 70 to 100% by mol, 80 to 100% by mol, and 90 to 99% by mol in a stepwise manner; the proportion is further preferably 92 to 98% by mol. In a case where the proportion of the constitutional unit having a fluorene ring-containing group is excessively low, it may be difficult to form a polyester-series resin exhibiting a negative orientation birefringence and a forward wavelength dispersibility.

The resin may not contain a third constitutional unit (C) different from the dicarboxylic acid unit (A) and the diol unit (B) or may contain the third constitutional units (C) if necessary in the scope that the effects of the present disclosure are not damaged. The third constitutional unit (C) may include, for example, a constitutional unit derived from: a hydroxyalkanoic acid or corresponding lactone, a polyfunctional polymerization component having three or more carboxyl groups and/or hydroxyl groups, a carbonate-bond-forming component, or other components.

The hydroxyalkanoic acid or corresponding lactone may include, for example, a $C_{2-10}$hydroxyalkanoic acid such as lactic acid, 3-hydroxybutyric acid, and 6-hydroxyhexanoic acid; and a lactone corresponding to a hydroxyalkanoic acid, such as ε-caprolactone.

As the polyfunctional polymerization component, there may be mentioned, a polyfunctional polymerization component having three or more carboxyl groups and/or hydroxyl groups in total, including a polycarboxylic acid having three or more carboxyl groups such as trimellitic acid and pyromellitic acid, and a polyhydric alcohol having three or more hydroxyl groups such as glycerin and pentaerythritol.

The carbonate-bond-forming component is a compound which is capable of forming a carbonate bond by a reaction with two diol components. That is, the term "constitutional unit derived from a carbonate-bond-forming component" means carbonyl group, and the carbonyl group forms a carbonate bond together with two terminal oxygen atoms of two diol units adjacently bonded to the carbonyl group. Representative examples of the carbonate-bond-forming component may include phosgenes such as phosgene and triphosgene, and carbonate diesters such as diphenyl carbonate.

The proportion of the third constitutional unit (C) relative to the total constitutional units (the total amount of the dicarboxylic acid unit (A), the diol unit (B), and the third constitutional unit (C)) may be, for example, not more than 50% by mol. A preferred range of the proportion is not more than 40% by mol, not more than 30% by mol, not more than 20% by mol, not more than 10% by mol, and not more than 5% by mol in a stepwise manner. It is preferred that the constitutional unit be substantially free from the third constitutional unit (C). The proportion may be about 0 to 10% by mol, for example, about 0.01 to 1% by mol.

(Production Method and Characteristic of Polyester-Series Resin)

The method for producing the polyester-series resin can use a conventional method according to the species of the resin, other polymerization components (copolymerization components), or others. For example, in a case where the polyester-series resin is a polyester resin, the polyester resin is produced by allowing a dicarboxylic acid component (A) corresponding to each of the above-mentioned dicarboxylic acid units to react with a diol component (B) corresponding to the above-mentioned diol unit or others, and can be prepared by a conventional method, specifically, melt polymerization such as transesterification and direct polymerization, solution polymerization, interfacial polymerization, or other methods; preferred is melt polymerization. The reaction may be carried out in the presence or absence of solvent(s) depending on the polymerization method.

The feed ratio (preparation ratio) of the dicarboxylic acid component (A) relative to the diol component (B) may be, for example, 1/1.2 to 1/0.8, preferably 1/1.1 to 1/0.9, in terms of the former/the latter (molar ratio). The feed ratio does not necessarily have to be within this range. For the reaction, at least one component selected from each dicarboxylic acid component (A) and each diol component (B) may be used in excess of a planned introduction ratio. For example, the (poly)alkylene glycol component (B2) such as ethylene glycol that can be removed from the reaction system may be used in excess of an amount (or an introduction ratio) to be introduced in the resin.

The reaction may be carried out in the presence of catalyst(s). As the catalyst, a conventional esterification catalyst, for example, a metal catalyst, can be used. As the metal catalyst, there may be used a metal compound containing, for example, an alkali metal such as sodium; an alkaline earth metal such as magnesium, calcium, and barium; a transition metal such as titanium, manganese, and cobalt; a group 12 metal of the Periodic Table such as zinc and cadmium; a group 13 metal of the Periodic Table such as aluminum; a group 14 metal of the Periodic Table such as germanium and lead; and a group 15 metal of the Periodic Table such as antimony. The metal compound may be, for example, an alkoxide; an organic acid salt such as an acetate and a propionate; an inorganic acid salt such as a borate and a carbonate; and an oxide, or may be a hydrate thereof. Representative examples of the metal compound may include a germanium compound such as germanium dioxide, germanium hydroxide, germanium oxalate, germanium tetraethoxide, and germanium-n-butoxide; an antimony compound such as antimony trioxide, antimony acetate, and antimony ethylene glycolate; a titanium compound such as tetra-n-propyl titanate, tetraisopropyl titanate, tetra-n-butyl titanate (titanium(IV) tetrabutoxide), titanium oxalate, and titanium potassium oxalate; a manganese compound such as manganese acetate tetrahydrate; and a calcium compound such as calcium acetate monohydrate.

These catalysts may be used alone or in combination of two or more. In a case where a plurality of catalysts is used, each catalyst may be added according to the process of the reaction. Among these catalysts, manganese acetate tetrahydrate, calcium acetate monohydrate, germanium dioxide, titanium(IV) tetrabutoxide, and others are preferred. The amount of the catalyst is, for example, $0.01 \times 10^{-4}$ to $100 \times 10^{-4}$ mol, preferably $0.1 \times 10^{-4}$ to $40 \times 10^{-4}$ mol, relative to 1 mol of the dicarboxylic acid component (A).

The reaction may be carried out in the presence of a stabilizer such as a heat stabilizer or an antioxidant, if necessary. The heat stabilizer is practically used. Examples of the heat stabilizer may include a phosphorus compound such as trimethyl phosphate, triethyl phosphate, triphenyl phosphate, dibutyl phosphate (phosphoric acid dibutyl ester or dibutyl phosphate ester), phosphorous acid, trimethyl phosphite, and triethyl phosphite. Among them, dibutyl phosphate is often used. The amount of the heat stabilizer is, for example, $0.01 \times 10^4$ to $100 \times 10^4$ mol, preferably $0.1 \times 10^4$ to $40 \times 10^4$ mol, relative to 1 mol of the dicarboxylic acid component (A).

The reaction may be carried out in an atmosphere of an inert gas, for example, a nitrogen gas; and a rare gas such as helium and argon. The reaction may also be carried out under a reduced pressure, for example, about $1 \times 10^2$ to $1 \times 10^4$ Pa. The transesterification is preferably carried out under an atmosphere of an inert gas such as nitrogen gas. A polycondensation is preferably carried out under a reduced pressure. The reaction temperature may be selected according to the polymerization method. For example, the reaction temperature for melt polymerization is 150 to 320° C., preferably 180 to 310° C., and more preferably 200 to 300° C.

The glass transition temperature Tg of thus obtained polyester-series resin may be, for example, in a range of about 80 to 250° C. A preferred range of the glass transition temperature is 100 to 200° C., 110 to 170° C., 110 to 160° C., 115 to 150° C., 120 to 140° C., and 120 to 130° C. in a stepwise manner. In a case where the polyester-series resin has an excessively high glass transition temperature, the polyester-series resin may have a low formability, which may make it difficult to produce a film by melt forming. In a case where the polyester-series resin has an excessively low glass transition temperature, the polyester-series resin may have a low environmental reliability (heat resistance, water resistance (moisture resistance), dimensional stability to heat or water (moisture), and retardation stability to heat or water (moisture)) and may also have a low a reliability (or durability) under a moist heat environment after mounting in an image display device.

As described below, in a case where a retardation film is formed as a multilayer film (a laminated film), it is preferred to adjust the glass transition temperature of the polyester-series resin to near the glass transition temperature of the polyamide-series resin, since such an adjustment enables effective improvement in formability.

The weight-average molecular weight Mw of the polyester-series resin can be measured by gel permeation chromatography (GPC) or other means and may be selected from a range of, for example, about 20000 to 150000 in terms of polystyrene. A preferred range of the weight-average molecular weight in terms of polystyrene is 25000 to 120000, 30000 to 100000, 35000 to 90000, 40000 to 80000, 45000 to 75000, 50000 to 70000, and 55000 to 65000 in a stepwise manner. In a case where the weight-average molecular weight is excessively low, the polyester-series resin may have a low formability such as film formability or stretchability, and the resulting film may be broken by stretching or others or may have a low handleability due to an insufficient mechanical strength of the film. In a case where the weight-average molecular weight is excessively high, the polyester-series resin may have an excessively high melt viscosity, decreasing in formability.

In this description and claims, the glass transition temperature Tg and the weight-average molecular weight Mw can be measured according to the methods described in the after-mentioned Examples.

[Polyamide-Series Resin]

The polyamide-series resin is a resin of which a single film (an uniaxially stretched film) exhibits a positive orientation birefringence and exhibits a flat dispersibility in retardation. The polyamide-series resin has a chemical structure containing at least an amide bond (or an amide group) in a main chain thereof, and may include, for example, a polyamide resin, a polyamideimide resin, and a polyesteramide resin. These polyamide-series resins may be used alone or in combination of two or more. Among these polyamide-series resins, the polyamide resin is preferred from the viewpoint of formability or retardation expression.

The polyamide-series resin exhibiting the above-mentioned characteristics may include, for example, a polyamide-series resin containing a constitutional unit having an alicyclic skeleton (or an alicyclic hydrocarbon group), and preferably includes a polyamide-series resin containing a constitutional unit having an alicyclic skeleton on a main chain thereof.

As the resin having an alicyclic skeleton, a cyclic olefinic copolymer (COP) is conventionally used for a retardation film. The COP has a flat dispersibility and usually has a low retardation expression. The retardation expression (ease of expression of retardation or phase difference) can be improved by introduction of an aromatic ring skeleton in a chemical structure, while the wavelength dispersibility greatly changes from a flat dispersibility toward a forward wavelength dispersibility. Thus, it is extremely difficult to achieve a balance between a high retardation expression and a flat dispersibility.

The inventors of the present invention, however, found the following: a polyamide-series resin having an alicyclic skeleton can achieve surprisingly both a high retardation expression and a flat dispersibility, probably because amide groups in a main chain thereof can improve the phase difference without greatly changing the wavelength dispersibility toward the direction of forward dispersion; moreover, a combination of the polyamide-series resin with the above-mentioned specific polyester-series resin can achieve both a high retardation expression and a reciprocal wavelength dispersibility, particularly, such a combination enables the formation of a retardation film having improved formability (or productivity) and environmental reliability and having an excellent balance in thinness, retardation (phase difference), and reciprocal wavelength dispersibility.

The alicyclic skeleton is an aliphatic hydrocarbon ring (a non-aromatic hydrocarbon ring or a hydrocarbon ring free from an aromatic ring). The alicyclic skeleton may contain a multiple bond, such as a double bond, in a ring thereof, and is preferably free from a multiple bond. The aliphatic hydrocarbon ring can roughly be classified into a monocyclic aliphatic hydrocarbon ring and a bridged (or cross-linked) cyclic aliphatic hydrocarbon ring.

The monocyclic aliphatic hydrocarbon ring may include, for example, a cycloalkane ring and a cycloalkene ring. The cycloalkane ring may include, for example, a $C_{3-20}$cycloalkane ring such as cyclopropane ring, cyclobutane ring, cyclopentane ring, cyclohexane ring, cycloheptane ring, and cyclooctane ring. Examples of the cycloalkene ring may include a $C_{3-20}$cycloalkene ring such as cyclopentene ring and cyclohexene ring.

The bridged cyclic aliphatic hydrocarbon ring may include, for example, a bridged cyclic cycloalkane ring and a bridged cyclic cycloalkene ring. As the bridged cyclic cycloalkane ring, for example, there may be mentioned a $C_{7-20}$bi- to tetra-cycloalkane ring such as decalin ring, norbornane ring, adamantane ring, tricyclodecane ring, and tetracyclododecane ring. The tricyclodecane ring may include, for example, tricyclo[5.2.1.0$^{2,6}$]decane ring.

Examples of the tetracyclododecane ring may include tetracyclo[4.4.0.1$^{2,5}$.1$^{7,10}$]dodecane ring. The bridged cyclic cycloalkene ring may include, for example, a $C_{7-20}$bi- to tetra-cycloalkene ring such as norbornene ring, tricyclodecene ring, and tetracyclododecene ring.

The constitutional unit having an alicyclic skeleton may contain one or more these alicyclic skeletons in a chemical structure thereof. Among these alicyclic skeletons, a cycloalkane ring free from a multiple bond and a bridged cyclic cycloalkane ring free from a multiple bond are preferred. From the viewpoint of the flat dispersibility, preferred is a monocyclic cycloalkane ring, further preferred is a $C_{5-10}$cycloalkane ring, and especially preferred is a $C_{5-8}$cycloalkane ring such as cyclohexane ring.

The polyamide-series resin can be formed by polymerization of a diamine component and a dicarboxylic acid component, polymerization of an aminocarboxylic acid component and/or a lactam component, polymerization of a diamine component, a dicarboxylic acid component, and an aminocarboxylic acid component and/or a lactam component, or other polymerizations. Corresponding to the configuration of the polyamide-series resin, at least one of polymerization components forming the polyamide-series resin has an alicyclic skeleton. Thus, the polyamide-series resin is formed with components containing at least one polymerization component selected from the after-mentioned alicyclic diamine component, alicyclic dicarboxylic acid component, and alicyclic aminocarboxylic acid component. A representative polyamide-series resin is formed with polymerization components containing a diamine component (D) and a dicarboxylic acid component (E). It is preferred at least the diamine component have an alicyclic skeleton.

(Diamine Unit (D))
Alicyclic Diamine Unit (D1)

A diamine unit (D) preferably contains an alicyclic diamine unit (D1) having an alicyclic skeleton. The alicyclic diamine unit (D1) is a diamine unit having the above-exemplified alicyclic skeleton in a chemical structure thereof, and may be, for example, a diamine unit derived from: a $C_{5-10}$cycloalkanediamine such as cyclohexanediamine, a bis(amino$C_{1-4}$alkyl)$C_{5-10}$cycloalkane such as bis(aminomethyl)cyclohexane, or others. The alicyclic diamine unit (D1) preferably contains at least a diamine unit represented by the following formula (4):

[Chem. 10]

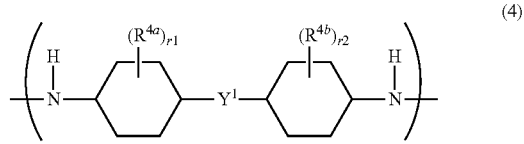

(4)

wherein $Y^1$ represents a direct bond, or a divalent hydrocarbon group which may have a substituent, $R^{4a}$ and $R^{4b}$ independently represent a substituent, and r1 and r2 independently denote an integer of 0 to 4.

In the formula (4), $Y^1$ may be a direct bond, and is preferably a divalent hydrocarbon group which may have a substituent. The divalent hydrocarbon group may be a divalent aromatic hydrocarbon group such as phenylene group. From the viewpoint of the flat dispersibility, preferred are a divalent alicyclic hydrocarbon group such as cyclohexylene group and a divalent aliphatic hydrocarbon group, and particularly preferred is a divalent aliphatic hydrocarbon group.

The divalent aliphatic hydrocarbon group represented by $Y^1$ may include, for example, a straight- or branched-chain alkenylene group, specifically a straight- or branched-chain $C_{2-20}$alkenylene group such as vinylene group, 1-methylvinylene group, propenylene group, 1-butenylene group, 2-butenylene group, 1-pentenylene group, and 2-pentenylene group; a straight- or branched-chain alkynylene group, specifically, a straight- or branched-chain $C_{2-20}$alkynylene group such as ethynylene group, propynylene group, 3-methyl-1-propynylene group, butynylene group, 2-pentynylene group, 2-hexynylene group, 3-heptynylene group, 4-octynylene group, 4-nonynylene group, 5-decynylene group, 6-undecynylene group and 6-dodecynylene group; a straight- or branched-chain alka-di- to tri-ynylene group, specifically 1,3-butadiynylene group, 2,4-pentadiynylene group, and 1,3,5-hexatriynylene group. The divalent aliphatic hydrocarbon group preferably includes a straight- or branched-chain alkylene group.

The straight- or branched-chain alkylene group represented by $Y^1$ may include, for example, a straight- or branched-chain $C_{1-20}$alkylene group such as methylene group, ethylene group, methylmethylene group (ethylidene group), propylene group, trimethylene group, and propane-2,2-diyl group (dimethylmethylene group). A preferred straight- or branched-chain alkylene group is a straight- or branched-chain $C_{1-10}$alkylene group, a straight- or branched-chain $C_{1-6}$alkylene group, a straight- or branched-chain $C_{1-4}$alkylene group, a straight- or branched-chain $C_{1-3}$alkylene group, and a straight- or branched-chain $C_{1-2}$alkylene group in a stepwise manner; methylene group is further preferred.

The optional substituent of the divalent hydrocarbon group represented by $Y^1$ may include, for example, an aryl group such as phenyl group, and a cycloalkyl group such as cyclohexyl group. The number of the substituents is not particularly limited to a specific one, and is, for example, 0 to 10, preferably 0 to 2, more preferably 0 or 1, and particularly 0. The divalent hydrocarbon group having a substituent may be, for example, 1-phenylethylene group and 1-phenylpropane-1,2-diyl group. The group $Y^1$ is preferably a straight- or branched-chain alkylene group having no substituent.

The substituents represented by $R^{4a}$ and $R^{4b}$ may be a non-reactive group or non-polymerizable substituent inactive to polymerization reaction, and may include, for example, groups which are the same as the groups exemplified in the optional substituent of the divalent hydrocarbon group in $X^{2a}$ and $X^{2b}$ of the formula (2). Among these substituents, preferred is an alkyl group, more preferably a straight- or branched-chain $C_{1-5}$alkyl group such as methyl group, ethyl group, propyl group, and isopropyl group, further preferably a straight- or branched-chain $C_{1-4}$alkyl group, especially preferably a straight- or branched-chain $C_{1-3}$alkyl group, and particularly preferably a straight- or branched-chain $C_{1-2}$alkyl group such as methyl group.

Each of the numbers r1 and r2 of the substituents $R^{4a}$ and $R^{4b}$ may be selected from a range of, for example, an integer of about 0 to 3, and is preferably 0 to 2, more preferably 0 or 1, and especially preferably 0. In particular, it is preferred that both r1 and r2 denote 0. In a case where r1 denotes not less than 2, the species of two or more $R^{4a}$ may be the same or different from each other. The same relationship between r1 and $R^{4a}$ also applies to r2 and $R^{4b}$. The species of the substituents $R^{4a}$ and $R^{4b}$ on different cyclohexane rings may be the same or different from each other.

Representative examples of the diamine unit represented by the formula (4) may include constitutional units derived from bis(aminocyclohexyl)alkanes, for example, a constitutional unit derived from: a bis(aminocyclohexyl)$C_{1-6}$alkane such as bis(4-aminocyclohexyl)methane and 2,2-bis(4-aminocyclohexyl)propane; a bis(amino-(mono- to tri-)$C_{1-6}$alkyl-cyclohexyl)$C_{1-6}$alkane such as bis(4-amino-3-methylcyclohexyl)methane, bis(4-amino-3,5-dimethylcyclohexyl) methane, and 2,2-bis(4-amino-3-cyclohexyl)propane; or others.

These diamine units represented by the formula (4) may be used alone or in combination of two or more. Among these diamine units represented by the formula (4), preferred is a constitutional unit derived from a bis(aminocyclohexyl) alkane, more preferably a bis(aminocyclohexyl)$C_{1-4}$alkane, further preferably a bis(aminocyclohexyl)$C_{1-3}$alkane, and especially preferably a bis(aminocyclohexyl)$C_{1-2}$alkane such as bis(4-aminocyclohexyl)methane.

The alicyclic diamine units (D1) may be used alone or in combination of two or more. In the alicyclic diamine units (D1), the proportion of the diamine unit represented by the formula (4) relative to the total alicyclic diamine units (D1) may be selected from a range of, for example, not less than 1% by mol, specifically about 10 to 100% by mol. A preferred range of the proportion is not less than 30% by mol, not less than 50% by mol, not less than 60% by mol, not less than 70% by mol, not less than 80% by mol, not less than 90% by mol, and not less than 95% by mol in a stepwise manner. In particular, it is preferred that the proportion be 100% by mol, specifically, the alicyclic diamine unit (D1) substantially contain only the diamine unit represented by the formula (4). In a case where the proportion is excessively low, it may be difficult to form a polyamide-series resin exhibiting a positive orientation birefringence and a flat dispersibility.

Second Diamine Unit (D2)

The polyamide-series resin may not contain a diamine unit (a second diamine unit (D2)) different from the alicyclic diamine unit (or a first diamine unit) (D1) as the diamine unit (D). The polyamide-series resin may contain the second diamine unit (D2) if necessary in the scope that the effects of the present disclosure are not damaged.

The second diamine unit (D2) may include, for example, a constitutional unit derived from an aliphatic diamine component, an aromatic (or araliphatic) diamine component, or other components.

Examples of the aliphatic diamine component may include a straight- or branched-chain $C_{2-20}$alkylenediamine such as tetramethylenediamine, hexamethylenediamine, 2-methylpentamethylenediamine, nonamethylenediamine, 2-methyloctamethylenediamine, trimethylhexamethylenediamine, decamethylenediamine, and dodecamethylenediamine.

The aromatic (or araliphatic) diamine component may include, for example, a diaminoarene, specifically a diamino$C_{6-14}$arene such as m-phenylenediamine and p-phenylenediamine; and a bis(aminoalkyl)arene, specifically a bis(amino$C_{1-4}$alkyl)arene such as m-xylylenediamine.

These second diamine units (D2) may be used alone or in combination of two or more.

The proportion of the alicyclic diamine unit (D1) relative to the total diamine units (D) may be selected from a range of, for example, not less than 1% by mol, specifically about 10 to 100% by mol. A preferred range of the proportion is not less than 30% by mol, not less than 50% by mol, not less than 60% by mol, not less than 70% by mol, not less than 80% by mol, not less than 90% by mol, and not less than 95% by mol in a stepwise manner. In particular, it is preferred that the proportion be 100% by mol, specifically, the diamine unit (D) substantially contain only the alicyclic diamine unit (D1). In a case where the proportion is excessively low, it may be difficult to form a polyamide-series resin exhibiting a positive orientation birefringence and a flat dispersibility.

(Dicarboxylic Acid Unit (E))

A dicarboxylic acid unit (E) may or may not contain the after-mentioned alicyclic dicarboxylic acid unit (E2), and preferably contains the after-mentioned aliphatic dicarboxylic acid unit (E1).

Aliphatic Dicarboxylic Acid Unit (E1)

In a case where the dicarboxylic acid unit (E) contains the aliphatic dicarboxylic acid unit (E1), the polyamide-series resin can adjust the glass transition temperature Tg in an appropriate range to easily improve the formability. Thus, a combination of the aliphatic dicarboxylic acid unit (E1) with the constitutional unit having an alicyclic skeleton, for example, the above-mentioned alicyclic diamine unit (D1) can effectively improve the formability although the constitutional unit contains the alicyclic skeleton.

An aliphatic dicarboxylic acid component forming the aliphatic dicarboxylic acid unit (E1) may include a dicarboxylic acid component in which two carboxyl groups are bonded to a divalent aliphatic hydrocarbon group or other groups, wherein the divalent aliphatic hydrocarbon group may be specifically exemplified as $Y^1$ of the formula (4).

These aliphatic dicarboxylic acid components may be used alone or in combination of two or more. Among these aliphatic dicarboxylic acid components, a straight- or branched-chain alkanedicarboxylic acid component is preferred. The straight- or branched-chain alkanedicarboxylic acid component may include, for example, a straight- or branched-chain $C_{1-20}$alkane-dicarboxylic acid component such as malonic acid, succinic acid, glutaric acid, adipic acid, pimelic acid, suberic acid, azelaic acid, sebacic acid, and 1,10-decanedicarboxylic acid; and is preferably a straight- or branched-chain $C_{4-16}$alkane-dicarboxylic acid component such as adipic acid, sebacic acid, and 1,10-decanedicarboxylic acid, further preferably a straight- or branched-chain $C_{6-14}$alkane-dicarboxylic acid component, and particularly preferably a straight- or branched-chain $C_{8-12}$alkanedicarboxylic acid component such as 1,10-decanedicarboxylic acid. Among the straight- or branched-chain alkanedicarboxylic acid components, a straight-chain alkanedicarboxylic acid component seems to be preferred.

The proportion of the aliphatic dicarboxylic acid unit (E1) relative to the total dicarboxylic acid units (E) may be selected from a range of, for example, about not less than 1% by mol, specifically about 10 to 100% by mol. A preferred range of the proportion is not less than 30% by mol, not less than 50% by mol, not less than 60% by mol, not less than 70% by mol, not less than 80% by mol, not less than 90% by mol, and not less than 95% by mol. In particular, it is preferred that the proportion be 100% by mol, specifically, the dicarboxylic acid unit (E) substantially contain only the aliphatic dicarboxylic acid unit (E1). In a case where the proportion is excessively low, the resulting polyamide-series resin may have a low formability.

Alicyclic dicarboxylic acid unit (E2) The dicarboxylic acid unit (E) does not necessarily need to contain an alicyclic dicarboxylic acid unit (E2). For example, in a case where the diamine unit (D) contains the alicyclic diamine unit (D1), the dicarboxylic acid unit (E) may not contain the alicyclic dicarboxylic acid unit (E2), or if necessary, may contain the alicyclic dicarboxylic acid unit (E2) as the constitutional unit having an alicyclic skeleton.

The alicyclic dicarboxylic acid unit (E2) may include a dicarboxylic acid unit having one or more of the aliphatic hydrocarbon rings exemplified above as the alicyclic skeleton. The alicyclic skeletons may be used alone or in combination of two or more. For the plurality of the alicyclic skeletons, the alicyclic skeletons may be bonded to each other by a direct bond or through a divalent aliphatic hydrocarbon group or other groups, wherein the divalent aliphatic hydrocarbon group may be specifically exemplified as $Y^1$ in formula (4). Such an alicyclic skeleton may have a substituent, for example, an alkyl group, specifically may have a $C_{1-6}$alkyl group such as methyl group.

Representative examples of the alicyclic dicarboxylic acid unit (E2) may include the constitutional units derived from the alicyclic dicarboxylic acid components, specifically exemplified as the second dicarboxylic acid unit (A2). These alicyclic dicarboxylic acid units (E2) may be used alone or in combination of two or more. A preferred alicyclic dicarboxylic acid unit (E2) includes a cycloalkanedicarboxylic acid, and is further preferably a $C_{5-10}$cycloalkanedicarboxylic acid such as 1,4-cyclohexanedicarboxylic acid.

Third Dicarboxylic Acid Unit (E3)

The polyamide-series resin may not contain, as the dicarboxylic acid unit (E), a dicarboxylic acid unit (a third dicarboxylic acid unit) (E3) different from the aliphatic dicarboxylic acid unit (or the first dicarboxylic acid unit) (E1) and the alicyclic diamine unit (or the second dicarboxylic acid unit) (E2), or may contain the dicarboxylic acid unit (E3) if necessary in the scope that the effects of the present disclosure are not damaged.

The third dicarboxylic acid unit (E3) may include, for example, a constitutional unit derived from an aromatic dicarboxylic acid component. Examples of the aromatic dicarboxylic acid component may include a dicarboxylic acid component in which an aromatic hydrocarbon ring, for example, a $C_{6-20}$ aromatic hydrocarbon ring such as a benzene ring, a naphthalene ring, an anthracene ring, and a fluorene ring, has two carboxyl groups as substituents. The aromatic dicarboxylic acid component may have one or a plurality of the aromatic hydrocarbon rings or may have the aromatic hydrocarbon rings alone or in combination of two or more. For the plurality of the aromatic hydrocarbon rings, the aromatic hydrocarbon rings may be bonded to each other by a direct bond or through a divalent aliphatic hydrocarbon or a divalent alicyclic hydrocarbon group or other groups, wherein the divalent groups may be specifically exemplified as $Y^1$ in formula (4). The aromatic hydrocarbon ring skeleton may have a substituent, for example, an alkyl group and a cycloalkyl group, and specifically may have a $C_{1-6}$alkyl group such as methyl group, a $C_{3-6}$cycloalkyl group such as cyclohexyl group, or other groups.

Representative examples of the aromatic dicarboxylic acid component may include the aromatic dicarboxylic acid components specifically exemplified in the second dicarboxylic acid unit (A2), for example, a benzenedicarboxylic acid component such as isophthalic acid and terephthalic acid.

These third dicarboxylic acid units (E3) may be used alone or in combination of two or more.

The proportion of the total amount of the aliphatic dicarboxylic acid unit (E1) and the alicyclic dicarboxylic acid unit (E2) relative to the total dicarboxylic acid units (E) may be selected from a range of, for example, about not less than 1% by mol, specifically about 10 to 100% by mol. A preferred range of the proportion is not less than 30% by mol, not less than 50% by mol, not less than 60% by mol, not less than 70% by mol, not less than 80% by mol, not less than 90% by mol, and not less than 95% by mol in a stepwise manner. In particular, it is preferred that the proportion be 100% by mol, specifically, the dicarboxylic acid unit (E) substantially contain only the aliphatic dicarboxylic acid unit (E1) and/or the alicyclic dicarboxylic acid unit (E2). In a case where the proportion is excessively low, the resulting polyamide-series resin may have a low formability or it may be difficult to form a polyamide-series resin exhibiting a positive orientation birefringence and a flat dispersibility.

(Aminocarboxylic Acid (or Lactam) Unit (F))

The polyamide-series resin may or may not contain an aminocarboxylic acid (or a corresponding lactam) unit (F).

Alicyclic Aminocarboxylic Acid Unit (F1)

The aminocarboxylic acid unit (F) may or may not contain an alicyclic aminocarboxylic acid unit (F1). The alicyclic aminocarboxylic acid unit (F1) may include, for example, a constitutional unit derived from an aminocycloalkanecarboxylic acid component, specifically an amino$C_{5-10}$cycloalkane-carboxylic acid component such as aminocyclohexanecarboxylic acid, or other components. These alicyclic aminocarboxylic acid units (F1) may be used alone or in combination of two or more.

Second Aminocarboxylic Acid Unit (F2)

The polyamide-series resin may not contain, as the aminocarboxylic acid unit (F), an aminocarboxylic acid unit (a second aminocarboxylic acid unit) (F2) different from the alicyclic aminocarboxylic acid unit (or a first aminocarboxylic acid unit) (F1), or may contain the second aminocarboxylic acid unit (F2) if necessary in the scope that the effects of the present disclosure are not damaged.

The second aminocarboxylic acid unit (F2) may include, for example, a constitutional unit derived from an aliphatic aminocarboxylic acid component (or a corresponding lactam component), an aromatic aminocarboxylic acid component, or other components.

Examples of the aliphatic aminocarboxylic acid component may include an amino$C_{2-20}$alkylcarboxylic acid component such as 6-aminohexanoic acid, 11-aminoundecanoic acid, and 12-aminododecanoic acid, and is preferably an amino$C_{4-16}$alkylcarboxylic acid component, and further preferably an amino$C_{5-11}$alkylcarboxylic acid component. The corresponding lactam component may include, for example, a 4- to 12-membered lactam such as ε-caprolactam and ω-laurolactam, and is preferably a 7- to 12-membered lactam.

The aromatic aminocarboxylic acid component may include, for example, an aminoarenecarboxylic acid such as aminobenzoic acid.

These second aminocarboxylic acid units (F2) may be used alone or in combination of two or more.

The proportion of the total amount of the diamine unit (D) and the dicarboxylic acid unit (E) forming the polyamide-series resin relative to the total constitutional units of the polyamide-series resin may be selected from a range of, for example, about not less than 1% by mol, specifically about 10 to 100% by mol. A preferred range of the proportion is not less than 30% by mol, not less than 50% by mol, not less than 60% by mol, not less than 70% by mol, not less than 80% by mol, not less than 90% by mol, and not less than 95% by mol in a stepwise manner. In particular, it is preferred that the proportion be 100% by mol, specifically, the polyamide-series resin substantially contain only the diamine unit (D) and the dicarboxylic acid unit (E).

The polyamide-series resin at least contains the constitutional unit having an alicyclic skeleton. The proportion of the total amount of the alicyclic diamine unit (D1), the alicyclic dicarboxylic acid unit (E2), and the alicyclic aminocarboxylic acid unit (F1) relative to the total constitutional units of the polyamide-series resin may be selected from a range of, for example, about not less than 1% by mol, specifically about 10 to 100% by mol. A preferred range of the proportion is 15 to 90% by mol, 20 to 80% by mol, 30 to 70% by mol, and 40 to 60% by mol in a stepwise manner; the proportion is further preferably 45 to 55% by mol. In a case where the proportion is excessively low, it may be difficult to form a polyamide-series resin exhibiting a positive orientation birefringence and a flat dispersibility. In a case where the proportion is excessively high, the resulting polyamide-series resin may have a low formability.

A preferred polyamide-series resin is a polyamide-series resin containing the alicyclic diamine unit (D1) and the aliphatic dicarboxylic acid unit (E1); more preferably a polyamide-series resin containing the diamine unit represented by the formula (4) and the constitutional unit derived from the straight- or branched-chain alkanedicarboxylic acid component; further preferably a polyamide-series resin containing the constitutional unit derived from the bis(aminocyclohexyl)alkane and the constitutional unit derived from the straight- or branched-chain $C_{4-16}$alkane-dicarboxylic acid component; especially preferably a polyamide-series resin containing the constitutional unit derived from the bis(aminocyclohexyl)$C_{1-4}$alkane and the constitutional unit derived from the straight- or branched-chain $C_{8-12}$alkanedicarboxylic acid component; and particularly preferably a polyamide-series resin containing a constitutional unit derived from a bis(aminocyclohexyl)$C_{1-3}$alkane such as bis(4-aminocyclohexyl)methane and a constitutional unit derived from a straight-chain $C_{8-12}$alkanedicarboxylic acid component such as 1,10-decanedicarboxylic acid.

The polyamide-series resin may be produced by a known method or may use a commercially available product. The commercially available product may include, for example, "Trogamid CX7323" manufactured by Daicel-Evonik Ltd., "Grilamid TR90" manufactured by Ems-Chemie, and "Rilsan G350" and "Rilsan G850" manufactured by Arkema.

The glass transition temperature Tg of the polyamide-series resin may be, for example, in a range of about 80 to 250° C. A preferred range of the glass transition temperature Tg is 100 to 200° C., 110 to 170° C., 115 to 150° C., 120 to 145° C., 125 to 140° C., and 130 to 135° C. in a stepwise manner. In a case where the polyamide-series resin has an excessively high glass transition temperature, the polyamide-series resin may have a low formability, which may make it difficult to produce a film by melt forming. In a case where the polyamide-series resin has an excessively low glass transition temperature, the polyamide-series resin may have a low environmental reliability (heat resistance and water resistance (moisture resistance), dimensional stability to heat or water (moisture), and retardation stability to heat or water (moisture)) and may also have a low reliability (or durability) under a moist heat environment after mounting in an image display device.

As described below, in a case where a retardation film is formed as a multilayer film (a laminated film), it is preferred to adjust the glass transition temperature of the polyamide-series resin to near the glass transition temperature of the polyester-series resin, since such an adjustment enables effective improvement in formability.

The weight-average molecular weight Mw of the polyamide-series resin can be measured by gel permeation chromatography (GPC) or other means and may be selected from a range of, for example, about 20000 to 100000 in terms of polystyrene. In a case where the weight-average molecular weight is excessively low, the polyamide-series resin may have a low formability such as film formability or stretchability, and the resulting film may be broken by stretching or others or may have a low handleability due to an insufficient mechanical strength of the film. In a case where the weight-average molecular weight is excessively high, the polyamide-series resin may have an excessively high melt viscosity, decreasing in formability.

[Retardation Film]
(Constitution)

The retardation film contains at least the polyester-series resin and the polyamide-series resin. The retardation film may contain one or more other conventional thermoplastic resins unless the effects of the present disclosure are damaged, and is preferably free from such a conventional thermoplastic resin. The proportion of the conventional thermoplastic resin relative to the total amount of the polyester-series resin and the polyamide-series resin is, for example, not more than 30% by mass, preferably not more than 10% by mass, and more preferably not more than 0 to 5% by mass.

The retardation film may contain various additives unless the effects of the present disclosure are damaged. Examples of such an additive may include a plasticizer such as an ester, a phthalic acid-series compound, an epoxy compound, and a sulfonamide; a flame retardant such as an inorganic flame retardant, an organic flame retardant, and a colloid flame retardant substance; a stabilizer such as an antioxidant, an ultraviolet absorbing agent, and a heat stabilizer; an antistatic agent; a filler such as an oxide-series inorganic filler, a non-oxide-series inorganic filler, and a metal powder; a foaming agent; a defoaming agent; a lubricant; a release agent such as a natural wax, a synthetic wax, a straight-chain fatty acid or a metal salt thereof, and an acid amide; a lubricating agent, specifically, an inorganic fine particle such as silica, titanium oxide, calcium carbonate, clay, mica, and kaolin, and an organic fine particle such as a (meth)acrylic resin and a (crosslinked) styrenic resin; and a compatibilizer. These additives may be used alone or in combination of two or more. These additives may be added by a conventional method, for example, a melt kneading method using a single-screw or twin-screw extruder. The total ratio of the additives relative to the total amount of the polyester-series resin and the polyamide-series resin is, for example, not more than 30% by mass, preferably not more than 10% by mass, and more preferably 0 to 5% by mass.

The retardation film may be a single-layer film containing the polyester-series resin and the polyamide-series resin, or is preferably a multilayer film (or a laminated film). For the multilayer film, the polyester-series resin and the polyamide-series resin may be included in one layer of the multilayer film. In a preferred embodiment from the viewpoint of the environmental reliability, easy adhesion in lamination with another optical element (or optical film) such as a polarizing plate, or other characteristics, the respective resins are included in separate layers, that is, the laminated film has a first layer (a polyester-series resin layer) containing the polyester-series resin and a second layer (a polyamide-series resin layer) containing the polyamide-series resin.

In the first layer, the proportion of the polyester-series resin relative to the total resin components forming the first layer may be selected from a range of, for example, about not less than 1% by mass, specifically about 10 to 100% by mass. A preferred range of the proportion is not less than 30% by mass, not less than 50% by mass, not less than 60% by mass, not less than 70% by mass, not less than 80% by mass, not less than 90% by mass, and not less than 95% by mass in a stepwise manner. It is further preferred that the proportion be 100% by mol, specifically, the resin component in the first layer substantially contain only the polyester-series resin. Also, the proportion of the polyamide-series resin in the second layer (the proportion relative to the total resin components forming the second layer), including preferred embodiments, corresponds to and is the same as the proportion of the polyester-series resin in the first layer. It is preferred that the resin component in the second layer substantially contain only the polyamide-series resin.

Moreover, for the multilayer film, the retardation film contains at least one first layer and at least one second layer, and may contain a plurality of first layers and/or a plurality of second layers. If necessary, the retardation film may or may not contain a third layer free from the polyester-series resin and the polyamide-series resin.

The number of layers in the multilayer film may be selected from a range of, for example, about 2 to 10. A preferred range of the number is 2 to 8, 2 to 6, 2 to 4, and 2 to 3 in a stepwise manner; the number is further preferably 3.

For the multilayer film having a three-layer structure, preferred is a three-layer structure (two-kinds three-layer structure) having a core layer positioned in the center and skin layers formed with the same resin on both sides of the core layer; and further preferred is the three-layer structure in which the both skin layers have substantially the same thickness (average thickness). The multilayer film may curl due to a difference in contraction force after formation between the resins forming each layer and thus may decrease in handleability. However, for the multilayer film having the above-mentioned three-layer structure, the difference in contraction force is cancelled by the skin layers on the both sides, and the retardation film after formation can effectively be prevented from curling.

The three-layer structure may be formed with the first layer (the polyester-series resin layer) as the core layer as and the second layer (the polyamide-series resin layer) as the skin layers on the both sides. The three-layer structure may preferably be formed with the first layer as the skin layers on both sides of the second layer as the core layer. The second layer formed with the polyamide-series resin having a high water absorption is disposed inside as the core layer and the polyester-series resin layers are disposed outside as the skin layers, thereby effectively improving the environmental reliability (dimensional stability and retardation stability) under water (or under a moist heat environment). Moreover, in a case where such a film and another optical element such as a polarizer (or a polarizing plate) are laminated for use, the polyester-series resin layer as the skin layers (outermost layers) are preferred from the viewpoint of easy adhesion. In particular, even in a case where such a film and a polarizer formed with a polyvinyl alcohol (PVA) film having a low water resistance are laminated, the polyester-series resin layers as the skin layers can effectively prevent the optical characteristics of the polarizer from lowering.

The retardation film is formed with the specific polyester-series resin and the specific polyamide-series resin in combination and thus can achieve both an excellent (or appropriate) reciprocal wavelength dispersibility and a high retardation (or phase difference). That is, a retardation film exhibiting a desired phase difference and a desired reciprocal wavelength dispersibility can be thinner even in the form of a multilayer film. Thus, the thickness (average thickness) of the retardation film may be about 20 to 70 µm. A preferred range of the thickness is 25 to 60 µm, 30 to 60 µm, 30 to 50 µm, and 30 to 45 µm in a stepwise manner; the thickness is further preferably 30 to 40 µm. In this description and claims, the thickness (average thickness) can be measured according to the methods described in the after-mentioned Examples.

In a case where the film has an excessively small thickness, the film may have a poor winding property in a film-forming step (the film may be easy to wrinkle or easy to be torn off and may have a difficulty in winding), and thus may fail to be wound stably and may be broken in a stretching step. In a case where the film has an excessively large thickness, the film may not meet a desired thinning of the retardation film. Moreover, in a case where a stress is caused by contraction or others under a moist heat environment, the film having an excessively large thickness may greatly change the retardation (or phase difference) due to an excessive loading, decreasing in optical characteristics (decreasing in environmental reliability). Furthermore, in a case where such a film and a polarizer (or a polarizing plate) are laminated for use, the optical characteristics of the polarizer may be decreased due to easy warp by drying in a laminating step.

In a case where the retardation film is a multilayer film containing the first layer and the second layer, the proportion of the total thickness (the total value of the average thickness of each first layer) of the first layer(s) relative to the total thickness (the total value of the average thickness of each second layer) of the second layer(s) may be selected from a range of, about 0.1/1 to 100/1, specifically about 0.3/1 to 50/1 in terms of the former/the latter; a preferred range of the proportion is 0.5/1 to 30/1, 0.7/1 to 20/1, 0.9/1 to 15/1, 1/1 to 10/1, 1.3/1 to 8/1, 1.5/1 to 7/1, and 1.8/1 to 6/1 in a stepwise manner. In a case where the after-mentioned ¼ wave plate is prepared, the proportion is more preferably 2/1 to 5/1, and further preferably 2/1 to 4.5/1. In a case where the after-mentioned retardation film for a VA-LCD is prepared, the proportion is more preferably 2/1 to 5.5/1, and further preferably 2.2/1 to 5/1.

Since the proportion of the total thickness of the first layer(s) relative to the total thickness of the second layer(s) in the retardation film (stretched film) is often equivalent to that of the laminated film before stretching (primary film or unstretched film), the proportion in the retardation film may be the proportion in the primary or unstretched film. In a case where the total thickness of the first layer(s) relative to the total thickness of the second layer(s) is excessively small, the retardation film may fail to exhibit an excellent reciprocal wavelength dispersibility. In a case where the total thickness of the first layer(s) relative to the total thickness of the second layer(s) is excessively large, the retardation film may fail to exhibit a reciprocal wavelength dispersibility. Moreover, in a case where the thickness of the first layer(s) is excessively large, it may be difficult to prepare a ¼ wave plate.

(Production Method, Characteristic, and Application)

The retardation film may be prepared at least through a film-forming step of forming the polyester resin and the polyamide-series resin into a film (a primary film), and a stretching step of stretching an unstretched film (or a primary film) obtained in the film-forming step.

The film forming method may include, for example, a casting method (a solution casting method), an extrusion method, and a calendaring method. The extrusion method may include a melt extrusion method such as an inflation method and a T-die method. The melt extrusion method such as the T-die method is preferred from the viewpoint of not only excellent formability but also prevention of lowering in optical characteristics due to a residual solvent.

In a case where the retardation film is a multilayer film, the first layer containing the polyester resin and the second layer containing the polyamide-series resin may be separately film-formed and stretched, and then laminated. From the viewpoint of formability (or productivity), it is preferred to costretch a laminated film (an unstretched film) obtained by coextrusion (or to stretch the first layer(s) and the second layer(s) at once). Such a method not only can eliminate a film-forming and a stretching step for each layer, a step of laminating each layer, or other steps but also can effectively reduce a failure (a lamination failure), for example, due to misalignment of the optical axis of each layer.

A representative film-forming method by coextrusion may include a method including drying each resin in a pellet form, for example, to a moisture percentage of less than 100 ppm, then weighing each resin pellet and each additive, mixing and feeding each resin mixture to each extruder, meeting (or merging) each molten resin (each resin mixture) using a slit-shaped die (T-die), and melt-extruding the resin from the die in the form of a sheet to give a unstretched film.

The melting temperature in the extruder of each resin with respect to the glass transition temperature Tg of each resin is, for example, preferably (Tg+50) to (Tg+180)° C., and more preferably (Tg+80) to (Tg+150)° C. In a case where the melting temperature in the extruder is excessively low, the resin may have an insufficient fluidity. In a case where the melting temperature is excessively high, the resin may have a low quality.

Each resin melted in the extruder may be continuously fed to the die, if necessary, via a filter, a gear pump, or others, or may be subjected to a high-precision filtration to effectively remove a foreign matter contained in each molten resin. A filter medium used for the high-precision filtration of the molten resin is not particularly limited to a specific one, and is preferably a sintered stainless steel due to an excellent removal performance thereof.

The slit-shaped die (T-die) may include, for example, a multi-manifold die and a feed block die. In order to precisely control the layer thickness, the multi-manifold die, in which the T-die is designed according to the viscosity of each resin, is preferred.

The average thickness (the total thickness) of the unstretched film obtained in the film-forming step (the laminated film obtained by coextrusion) may be selected from a range of, for example, about 10 to 1000 μm. A preferred range of the average thickness is 20 to 500 μm, 30 to 200 μm, 40 to 170 μm, 50 to 150 μm, 60 to 140 μm, 70 to 130 μm, 75 to 125 μm, and 80 to 120 μm in a stepwise manner. In a case where the unstretched film has an excessively large average thickness, the retardation film may be made thinner insufficiently. In a case where the unstretched film has an excessively small average thickness, the film may have a poor winding property (or may hardly be wound) and may fail to be wound stably, and may be broken in the stretching step or other steps. The average thickness can be measured according to the method described in the aftermentioned Examples.

In the stretching step, each resin film obtained in the film-forming step may be stretched. As described above, from the viewpoint of formability, it is preferred to costretch the coextruded film obtained in the film-forming step.

In the costretching, it is preferred that a difference in glass transition temperature Tg between the respective resins, particularly, a difference in Tg between the polyester-series resin and the polyamide-series resin, be small. Thus, the difference in Tg between the polyester-series resin and the polyamide-series resin may be adjusted to a range of, for example, about 0 to 30° C. A preferred range of the difference in Tg is 0 to 20° C., 0 to 15° C., 0 to 10° C., 0 to 8° C., and 0 to 5° C. in a stepwise manner. In a case where the difference in Tg is within such a range, a retardation film having desired characteristics can easily be formed and be made thinner even if the film is a multilayer film.

Specifically, stretching conditions in costretching, such as stretching temperature, stretching speed, and stretching ratio, are usually determined based on the results of stretching experiments in one film (a single film) of each layer. That is, based on characteristics, including retardation (or phase difference), wavelength dispersibility, and thickness, of the single film of each layer stretched at the same stretching conditions, the stretching conditions are considered so that desired characteristics can be obtained in overlapping or laminating each single layer. However, in a case where the difference in glass transition temperature Tg between the respective resins is excessively large, the stretching conditions adjustable to the desired characteristics may be in a narrow range, and this may decrease in formability (or productivity) or may make it difficult to form with the desired characteristics, or, in the first place, this may make stretching difficult.

In this description and claims, the difference in Tg in the case of containing three or more kinds in total of the polyester-series resin and the polyamide-series resin means a difference in Tg between the resin having the maximum Tg and the resin having the minimum Tg.

The stretching method may include, for example, a conventional method such as an inter-roll stretching, a hot-roll stretching, a compression stretching, and a tenter stretching. The stretching method may be a uniaxial stretching or may be a biaxial stretching.

The stretching methods or the stretching conditions such as stretching temperature, stretching ratio, and stretching speed may suitably be selected according to characteristics desired for the retardation film, applications of the film, or others. For example, in preparing a wave plate such as a ¼ wave plate, in particular a wide-band ¼ wave plate used for an organic EL display or others, the uniaxial stretching may be used. In preparing a retardation film for a VA-LCD, the biaxial stretching may be used.

(¼ Wave Plate)

The uniaxial stretching may be a fixed-end uniaxial stretching or may be a free-end uniaxial stretching; wherein the fixed-end uniaxial stretching is a uniaxial stretching which is conducted while maintaining or fixing a predetermined length of an in-plane film direction (a crosswise or width direction) perpendicular to a stretching direction (or while preventing neck-in (contraction)), and the free-end uniaxial stretching is a uniaxial stretching which is conducted without applying a stress to a crosswise or width direction of a film. Among them, the fixed-end uniaxial stretching which is a tenter stretching is preferred in light of less neck-in and easy adjustment of physical properties.

The stretching direction in the uniaxial stretching may be a longitudinal stretching that is a stretching in a direction substantially parallel to a longitudinal or length direction of a film, may be a transverse stretching that is a stretching in a crosswise or width direction perpendicular to the longitudinal direction of the film, or may be an oblique stretching that is a stretching in an oblique direction having a predetermined angle with respect to the longitudinal direction of the film. Among them, the oblique stretching is preferred. The angle of a direction (a stretching direction) of an in-plane slow axis of the film (a direction in which an in-plane refractive index of the film is maximum) with respect to the longitudinal direction of the film may be selected from a range of, for example, about 30 to 60°, and is preferably 35 to 55°, more preferably 40 to 50°, further preferably 42 to 48°, and particularly substantially 45°. In pasting (laminating) to a polarizing plate such as a linear polarizing plate by a roll-to-roll processing, a retardation film obtained by such an oblique stretching can easily be adjusted so that the slow axis can have an angle of 45° with respect to the absorption axis of the polarizing plate; and in producing a circularly polarizing plate, it is not necessary to laminate the retardation film and the polarizing plate in a batch manner including cutting and then laminating steps. Thus, such a retardation film is preferred from the viewpoint of an excellent formability (or productivity).

The stretching temperature is, for example, $(Tg_{min}-10)$ to $(Tg_{min}+20)°$ C., wherein $Tg_{min}$ represents the minimum value of the glass transition temperatures of all resin components contained in the layers. A preferred range of the stretching temperature is $(Tg_{min}-5)$ to $(Tg_{min}+17)°$ C., $Tg_{min}$ to $(Tg_{min}+15)°$ C., $(Tg_{min}+3)$ to $(Tg_{min}+13)°$ C., $(Tg_{min}+5)$ to $(Tg_{min}+11)°$ C., $(Tg_{min}+6)$ to $(Tg_{min}+10)°$ C., and $(Tg_{min}+7)$ to $(Tg_{min}+9)°$ C. in a stepwise manner. A specific temperature is, for example, 117 to 147° C. A preferred range of the temperature is 122 to 144° C., 127 to 142° C., 130 to 140° C., 132 to 138° C., 133 to 137° C., and 134 to 136° C. in a stepwise manner. In a case where the stretching temperature is excessively high, the resulting film not only may have a difficulty in exhibiting a desired retardation but also may fail to be stretched uniformly, making the thickness ununiform. In a case where the stretching temperature is excessively low, the resulting film not only may have a difficulty in exhibiting a desired retardation but also may be broken.

The stretching ratio may be selected from a range of, for example, about 1.1 to 10. A preferred range of the stretching ratio is 1.3 to 8, 1.5 to 6, 1.8 to 5, 2 to 4, and 2 to 3 in a stepwise manner; the stretching ratio is further preferably 2.2 to 2.8. In a case where the stretching ratio is excessively low, the resulting film may fail to obtain a desired retardation. However, the retardation film of the present disclosure has a high retardation expression, and is easily adjusted to a desired retardation even in a case where the film is thin. In contrast, in a case where the stretching ratio is excessively high, the resulting film may have an excessively high phase difference (or retardation) or may also be broken, and may have a large residual stress and thus change a phase difference due to contraction of the film under a moist heat environment. However, the retardation film of the present disclosure has a high retardation expression and can be adjusted to a desired phase difference (or retardation) even in stretching under a relatively mild condition, and thus can effectively prevent change of phase difference due to contraction. Moreover, the retardation film has an excellent formability or stretchability, and is hard to be broken due to a toughness thereof even in the form of a thin film.

The stretching speed (elongation percentage/minute) may be selected from a range of, for example, about 50 to 600%/minute, and is preferably 100 to 500%/minute, and further preferably 200 to 400%/minute. In this description and claims, the elongation percentage is defined as [(a length after stretching)−(a length before stretching)]/(a length before stretching)×100 [%]. In a case where the stretching speed is excessively high, the film may be broken. In a case where the stretching speed is excessively low, the film may fail to have a desired retardation.

A preheating treatment before the stretching and/or a heat fixing treatment after the stretching may be carried out. These treatments enable reduced non-uniformity in retardation of a film after the stretching and reduced non-uniformity in orientation angle (angle between the longitudinal direction of the film and the slow axis (or orientation axis)) due to bowing (a phenomenon where the slow axis (or orientation axis) becomes non-uniform (arched) in the crosswise or width direction due to distortion). Either one of the preheating treatment and the heat fixing treatment may be carried out. It is preferred to carry out both treatments. These treatments are preferably carried out while gripping the film with a clip (or a tenter). In particular, the treatment(s) and the stretching step are preferably carried out continuously.

In the preheating treatment, the heating temperature may be selected from a range of, for example, about $(Tg_{min}-10)$ to $(Tg_{min}+20)°$ C., and is preferably $(Tg_{min}+7)$ to $(Tg_{min}+9)°$ C., wherein $Tg_{min}$ represents the minimum value of the glass transition temperatures of all resin components contained in the layers. It is preferred that the heating temperature be the same as the stretching temperature. The preheating time may be selected from a range of, for example, about 1 second to 20 minutes, and is preferably 1 to 15 minutes and further preferably 5 to 12 minutes.

In the heat fixing treatment, the heating temperature is, for example, $(Tg_{min}-5)$ to $(Tg_{min}+25°)$ C. and preferably $Tg_{min}$ to $(Tg_{min}+15)°$ C., wherein $Tg_{min}$ represents the minimum value of the glass transition temperatures of all resin components contained in the layers. The heating temperature may be not higher than the stretching temperature, for example, about 1 to 50° C. lower than the stretching temperature, and is preferably 2 to 40° C. lower than the stretching temperature and further preferably 3 to 30° C. lower than the stretching temperature. Furthermore, the heating temperature is particularly preferably not higher than the stretching temperature and not higher than $Tg_{min}$. The time of the heat fixing treatment may be selected from a range of, for example, about 1 second to 10 minutes, and is preferably 5 seconds to 4 minutes, and further preferably 10 seconds to 2 minutes. In the heat fixing, it is preferred that the width between the tenters be reduced by about 0 to 10% with respect to the width after the completion of stretching.

As described above, in a case where a ¼ wave plate is formed by a uniaxial stretching, the resulting retardation film may have, for example, a Ro(550) of about 100 to 170 nm, wherein Ro(λ) represents an in-plane retardation at a wavelength of λ nm. A preferred Ro(550) is 110 to 160 nm, 120 to 155 nm, 125 to 150 nm, 130 to 145 nm, and 133 to 143 nm in a stepwise manner.

Moreover, the ratio Ro(450)/Ro(550) may be, for example, about not less than 0.7 and less than 1. A preferred range of the ratio is 0.75 to 0.95, 0.8 to 0.9, and 0.81 to 0.87 in a stepwise manner.

For an ideal wide-band ¼ wave plate, Ro(550) is 137.5 nm, and the ratio Ro(450)/Ro(550) is about 0.818. The closer Ro(550) and the ratio Ro(450)/Ro(550) are to the above-mentioned ideal values, the more excellent the wide-band ¼ wave plate is. Among the characteristics of the in-plane retardation Ro(550), the dispersibility Ro(450)/Ro (550), and the thickness (thinness), in particular, it is emphasized that the in-plane retardation Ro(550) is close to the ideal value. In this description and claims, Ro(550) and the ratio Ro(450)/Ro(550) can be measured according to the methods described in the after-mentioned Examples.

(Retardation Film for VA-LCD)

A retardation film (an optical compensation film) for a vertically aligned liquid crystal display (VA-LCD) can be prepared by a biaxial stretching. The biaxial stretching may be a simultaneous biaxial stretching, in which a film is stretched simultaneously in the longitudinal direction and the transverse direction, or may be a sequential biaxial stretching, in which a film is stretched every one direction. The biaxial stretching may be a stretching at the same (or equal) stretching ratio in the longitudinal direction and the transverse direction (such a stretching may be referred to as an equal stretching) or may be a stretching at a different stretching ratio in each direction (such a stretching may be referred to as a biased stretching).

A preferred biaxial stretching includes a sequential biaxial stretching in light of free and easy adjustment of the stretching conditions, excellent formability, and prevention of non-uniformity in in-plane slow axis of the film. In the sequential biaxial stretching, a longitudinal stretching, which is a stretching in the longitudinal direction of a film, and a transverse stretching, which is a stretching in the crosswise direction of the film, may be carried out non-continuously (a film may be wound after stretching in one direction, and the wound film is then subjected to a stretching in the other direction). From the viewpoint of formability (or productivity), it is preferred to continuously carry out the longitudinal stretching and the transverse stretching. A specific stretching method may include, for example, the above-mentioned method. The longitudinal stretching is preferably an inter-roll stretching or a tenter stretching, the transverse stretching is preferably a tenter stretching.

The longitudinal stretching and the transverse stretching are not limited to a particular order. It is preferred to carry out the longitudinal stretching and then the transverse stretching, and is further preferred to carry out the longitudinal stretching and then the transverse stretching under stretching conditions stronger than those of the longitudinal stretching (or under stretching conditions so that molecular chains can be more oriented to give a higher retardation). Such a sequential biaxial stretching is preferred, since the sequential biaxial stretching can form a film in which the angle of an in-plane slow axis of the film (a direction in which an in-plane refractive index of the film is maximum) with respect to the longitudinal direction of the film is substantially perpendicularity (90°), for example, 80 to 100° and preferably 85 to 95°.

Specifically, as described above, linear polarizing plates (linear polarizing films) are disposed above and below a liquid crystal cell, and the retardation film for a VA-LCD is disposed between the liquid crystal cell and at least one of the linear polarizing plates. Specifically, the retardation film is used in a form laminated so that the in-plane slow axis of the retardation film can be substantially perpendicular to the absorption axis of the linear polarizing plate. Since the linear polarizing plate is usually disposed so as to have an absorption axis in the longitudinal direction of the film, the lamination of the linear polarizing plate and the retardation film of which the slow axis is substantially perpendicular to the longitudinal direction of the film as described above is achievable by a roll-to-roll processing and it thus advantageous in formability (or productivity).

The stretching temperature in the longitudinal stretching and that in the transverse stretching may be the same or may be different from each other. Such a stretching temperature is, for example, $(Tg_{min}-10)$ to $(Tg_{min}+30)°$ C., wherein $Tg_{min}$ represents the minimum value of the glass transition temperatures of all resin components contained in the layers. A preferred range of the stretching temperature is $Tg_{min}$ to $(Tg_{min}+20)°$ C., $(Tg_{min}+5)$ to $(Tg_{min}+15)°$ C., $(Tg_{min}+7)$ to $(Tg_{min}+13)°$ C., $(Tg_{min}+8)$ to $(Tg_{min}+12)°$ C., and $(Tg_{min}+9)$ to $(Tg_{min}+11)°$ C. in a stepwise manner. A specific temperature is, for example, 117 to 157° C. A preferred range of the temperature is 127 to 147° C., 132 to 142° C., 134 to 140° C., 135 to 139° C., and 136 to 138° C. in a stepwise manner. In a case where the stretching temperature is excessively high, the resulting film not only may have a difficulty in exhibiting a desired retardation but also may fail to be stretched uniformly, making the thickness ununiform. In a case where the stretching temperature is excessively low, the resulting film not only may have a difficulty in exhibiting a desired retardation but also may be broken.

The stretching ratio in the longitudinal stretching and that in the transverse stretching may be the same, and is preferably different from each other. Further preferably, the stretching ratio in the transverse stretching is larger than that in the longitudinal stretching. The stretching ratio in the longitudinal stretching (or stretching in a machine direction (MD) (or a longitudinal direction of a film)) may be selected from a range of, for example, about 1.1 to 10. A preferred range of the stretching ratio is 1.2 to 2.5, 1.3 to 2.3, 1.4 to 2.1, 1.5 to 2, and 1.6 to 1.9 in a stepwise manner; the stretching ratio is further preferably 1.7 to 1.8. The stretching ratio in the transverse stretching (or stretching in a transverse direction (TD) (or a crosswise direction of a film)) may be selected from a range of, for example, about 1.1 to 10. A preferred range of the stretching ratio is 1.5 to 5, 1.8 to 3.5, 2 to 3, 2.1 to 2.8, and 2.2 to 2.6 in a stepwise manner; the stretching ratio is further preferably 2.3 to 2.5. In a case where the stretching ratio is excessively low, the resulting film may fail to obtain a desired retardation. However, the retardation film of the present disclosure has a high retardation expression, and is easily adjusted to a desired retardation even in a case where the film is thin. In contrast, in a case where the stretching ratio is excessively high, the resulting film may have an excessively high retardation or may also be broken, and may have a large residual stress and change a phase difference due to contraction of the film under a moist heat environment. However, the retardation film of the present disclosure has a high retardation expression and can be adjusted to a desired retardation even in stretching under a relatively mild condition, and thus can effectively prevent change of phase difference with contraction. Moreover, the retardation film has an excellent formability or stretchability, and the retardation film is hard to be broken due to a toughness thereof even in the form of a thin film.

The stretching speed (elongation percentage/minute) in the longitudinal stretching and that in the transverse stretching may be the same or may be different from each other. The stretching speed (elongation percentage/minute) in the longitudinal stretching may be selected from a range of, for example, about 50 to 600%/minute, and is preferably 100 to 500%/minute, and further preferably 200 to 400%/minute. The stretching speed (elongation percentage/minute) in the transverse stretching may be selected from a range of, for example, about 50 to 600%/minute, and is preferably 100 to 500%/minute, and further preferably 200 to 400%/minute. In a case where the stretching speed is excessively high, the film may be broken. In a case where the stretching speed is excessively low, the film may fail to obtain a desired retardation.

A preheating treatment before the stretching and/or a heat fixing treatment after the stretching may be carried out. These treatments enable reduced non-uniformity in retardation of a film after the stretching and reduced non-uniformity in orientation angle (angle between the longitudinal direction of the film and the slow axis (or orientation axis)) due to bowing (a phenomenon where the slow axis (or orientation axis) becomes non-uniform (arched) in the crosswise or width direction by distortion)). Either one of the preheating treatment and the heat fixing treatment may be carried out. It is preferred to carry out both treatments. These treatments are preferably carried out while gripping the film with a clip (or a tenter). In particular, the treatment(s) and the stretching step are preferably carried out continuously.

In the preheating treatment, the heating temperature may be selected from a range of, for example, about $(Tg_{min}-10)$ to $(Tg_{min}+30)°$ C., and is preferably $(Tg_{min}+9)$ to $(Tg_{min}+11)°$ C., wherein $Tg_{min}$ represents the minimum value of the glass transition temperatures of all resin components contained in the layers. It is preferred that the heating temperature be the same as the stretching temperature. The preheating time may be selected from a range of, for example, about 1 second to 20 minutes, and is preferably 1 to 15 minutes and further preferably 5 to 12 minutes.

In the heat fixing treatment, the heating temperature is, for example, $(Tg_{min}-5)$ to $(Tg_{min}+25°)$ C. and preferably $Tg_{min}$ to $(Tg_{min}+15)°$ C., wherein $Tg_{min}$ represents the minimum value of the glass transition temperatures of all resin components contained in the layers. The heating temperature may be not higher than the stretching temperature, for example, about 1 to 50° C. lower than the stretching temperature, and is preferably 2 to 40° C. lower than the stretching temperature and further preferably 3 to 30° C. lower than the stretching temperature. Furthermore, the heating temperature is particularly preferably not higher than the stretching temperature and not higher than $Tg_{min}$ The time of the heat fixing treatment may be selected from a range of, for example, about 1 second to 10 minutes, and is preferably 5 seconds to 4 minutes and further preferably 10 seconds to 2 minutes. In the heat fixing, it is preferred that the width between the tenters be reduced by about 0 to 10% with respect to the width after the completion of stretching.

As described above, in a case where a retardation film for a VA-LCD is formed by a biaxial stretching, the retardation film for a VA-LCD may have an in-plane retardation Ro(550) of, for example, about 20 to 65 nm, wherein Ro($\lambda$) represents an in-plane retardation at a wavelength of $\lambda$ nm. A preferred Ro(550) is 25 to 60 nm and 30 to 55 nm in a stepwise manner.

The ratio Ro(450)/Ro(550) of the retardation film for a VA-LCD may be, for example, about not less than 0.7 and less than 1. A preferred range of the ratio is 0.75 to 0.95, 0.78 to 0.93, 0.8 to 0.92, 0.81 to 0.91, and 0.818 to 0.9 in a stepwise manner.

Moreover, the retardation film may have a thickness-direction retardation Rth(589) of, for example, about 100 to 160 nm, wherein Rth($\lambda$) represents a thickness-direction retardation at a wavelength of $\lambda$ nm. A preferred range of Rth(589) is 110 to 150 nm, 115 to 145 nm, 120 to 140 nm, and 125 to 135 nm in a stepwise manner.

For the retardation film for a VA-LCD, particularly for television (TV), among the characteristics of the in-plane retardation Ro(550), the dispersibility Ro(450)/Ro(550), the thickness-direction retardation (or the retardation of the thickness direction) Rth(589), and the thickness (thinness), Ro(550), Ro(450)/Ro(550), and Rth(589) are significant characteristics. In particular, it is most emphasized that Ro(550) and Rth(589) are in the preferred ranges mentioned above.

In this description and claims, Ro(550), Ro(450)/Ro(550), and Rth(589) can be measured according to the methods described in the after-mentioned Examples.

EXAMPLES

The following examples are intended to describe the present disclosure in further detail and should by no means be interpreted as defining the scope of the present disclosure. The details of evaluation methods and raw materials are shown below.

[Evaluation Method]
(Glass Transition Temperature Tg)

A differential scanning calorimeter (manufactured by Seiko Instruments Inc., "DSC 6220") was used to measure Tg of a sample placed in an aluminum pan at a range of 30° C. to 200° C. under a nitrogen gas atmosphere at a heating rate of 10° C./minute.

(Molecular Weight)

A gel permeation chromatography (manufactured by Tosoh Corporation, "HLC-8120GPC") was used to measure a weight-average molecular weight Mw in terms of polystyrene of a sample dissolved in chloroform.

(In-Plane Retardation Ro and Thickness-Direction Retardation Rth)

A retardation measuring apparatus ("RETS-100" manufactured by Otsuka Electronics Co., Ltd.) was used to measure an in-plane retardation Ro(450) at a wavelength of 450 nm and an in-plane retardation Ro(550) at a wavelength of 550 nm of a stretched film as measured values in a thickness of each sample. From the resulting values, Ro(450) was divided by Ro(550) to determine the ratio Ro(450)/Ro(550). A thickness-direction retardation Rth (589) at a wavelength of 589 nm of a stretched film was also measured by the same apparatus.

(Average Thickness)

A thickness gage ("Micrometer" manufactured by Mitutoyo Corporation) was used to measure a thickness of a film at a plurality of points at a predetermined interval, and the average of the measurements was calculated. In any of primary films and stretched films in Examples, the average thickness of the film was substantially the same as the thickness around the center of the film.

[Raw Materials]

FDPM: 9,9-bis(2-methoxylcarbonylethyl)fluorene [another name: dimethyl ester of 9,9-bis(2-carboxyethyl)fluorene, or dimethyl ester of fluorene-9,9-dipropionic acid)], which was synthesized in the same manner as described in Example 1 of Japanese Patent Application Laid-Open Publication No. 2005-89422 except that 56.6 g (0.44 mol) of t-butyl acrylate was changed to 37.9 g (0.44 mol) of methyl acrylate BPEF: 9,9-bis[4-(2-hydroxyethoxy)phenyl]fluorene, manufactured by Osaka Gas Chemicals Co., Ltd.

EG: ethylene glycol

Polyamide resin: polyamide resin formed with a diamine unit represented by the formula (4) in which $Y^1$ represents $CH_2$ group and r1 and r2 each denote 0 and a dicarboxylic acid unit [—OC—$(CH_2)_{10}$—CO—] derived from dodecanedioic acid, "TROGAMID CX7323" manufactured by Daicel-Evonik Ltd., glass transition temperature Tg: 132° C.

Synthesis Example 1

Manganese acetate tetrahydrate ($2\times10^4$ mol) and calcium acetate monohydrate ($8\times10^4$ mol) as transesterification catalysts were added to 1.00 mol of FDPM, 0.90 mol of BPEF, and 2.10 mol of EG, and the resulting mixture was gradually heat-melted while stirring. After the mixture was heated to 230° C., $14\times10^4$ mol of trimethyl phosphate and $20\times10^4$ mol of germanium oxide were added thereto. EG was removed from the resulting mixture while the mixture was gradually heated and depressurized to reach 270° C. and not more than 0.13 kPa. After reached a predetermined stirring torque, the content was removed from the reactor and was prepared to give a pellet of a fluorene ring-containing polyester.

A $^1$H-NMR analysis of the resulting pellet found that 100% by mol of the dicarboxylic acid unit introduced to the fluorene ring-containing polyester was derived from FDPM, 90% by mol of the diol unit introduced thereto was derived from BPEF, and 10% by mol of the diol unit introduced thereto was derived from EG.

The resulting fluorene ring-containing polyester had a glass transition temperature Tg of 127° C. and a weight-average molecular weight Mw of 60000.

Examples 1 to 5

For each Example, a multilayer film having a two-kinds three-layer structure including a skin layer laminated on each side of the core layer was produced. In the multilayer film, the skin layers were formed with the fluorene ring-containing polyester produced in Synthesis Example 1, and the core layer was formed with the polyamide resin. Specifically, the fluorene ring-containing polyester and the polyamide resin were separately dried, and then were separately fed to extruders (an extruder for skin layer: $\phi$25 mm, L/D=25; an extruder for core layer: $\phi$30 mm, L/D=38) having a feed block type T-die (die width: 300 mm) attached thereto, and were subjected to a melt extrusion so that the resulting primary film could have setting thicknesses (a thickness in each layer, a total thickness) described in Table 1, and thus a multilayer film (a primary film) having a two-kinds three-layer structure and having an average total thickness of 100 μm was produced.

For each multilayer film obtained, the film was cut into a size of 60 mm×60 mm, and a region of the cut film excluding chuck portions, that is, a region having an effective width of 40 mm, was subjected to a fixed-end uniaxial stretching in the transverse direction (TD) at a stretching temperature and a stretching ratio described in Table 1, and a stretching speed of 120 mm/minute (300%/minute) using a tenter-type stretching apparatus ("IMC-1A97 type" manufactured by Imoto machinery Co., Ltd.) to give a stretched film. Before the stretching, the multilayer film was subjected to a pre-heating treatment for 10 minutes at the same temperature as the stretching temperature. The resulting stretched film had a thickness ratio of each layer equivalent to that in the primary film.

Table 1 shows the Ro(450), Ro(550), and Ro(450)/Ro(550) of the resulting stretched film, and the average thickness (total thickness) of the film after the stretching.

In Table 1, the thickness of the skin layers in the primary film represents the total thickness of two skin layers. The thickness per skin layer is 37.5 μm.

layer laminated on each side of the core layer was produced in the same manner as in Example 1 except that a melt extrusion was subjected so that the resulting primary film could have setting thicknesses (a thickness in each layer, a total thickness) described in Table 2 to give a multilayer film having a two-kinds three-layer structure and having an average total thickness of 170 μm. In the multilayer film, the skin layers were formed with the fluorene ring-containing polyester produced in Synthesis Example 1, and the core layer was formed with the polyamide resin.

For each multilayer film obtained, the film was cut into a size of 60 mm×60 mm, and a region of the cut film excluding chuck portions, that is, a region having an effective width of 40 mm, was subjected to a sequential biaxial stretching (a stretching in the MD and then a stretching in the TD) at a stretching temperature and a stretching ratio described in Table 2, and a stretching speed of 120 mm/minute (300%/

TABLE 1

| | Primary film | | | Stretching condition | | Stretched film | | | |
|---|---|---|---|---|---|---|---|---|---|
| | Thickness of skin layers | Thickness of core layer | Total thickness | Temperature | Stretching ratio | Total thickness | In-plane retardation Ro (nm) | | Dispersibility |
| | (μm) | (μm) | (μm) | (° C.) | (times) | (μm) | Ro (450) | Ro (550) | Ro (450)/Ro (550) |
| Example 1 | 75 | 25 | 100 | 133 | 2.5 | 39 | 114 | 131 | 0.870 |
| Example 2 | | | | 134 | 2.5 | 35 | 130 | 142 | 0.917 |
| Example 3 | | | | 135 | 2.5 | 35 | 131 | 142 | 0.925 |
| Example 4 | | | | 136 | 2.5 | 39 | 129 | 141 | 0.914 |
| Example 5 | | | | 137 | 2.8 | 35 | 139 | 148 | 0.938 |

As apparent from Table 1, the retardation films obtained in Examples 1 to 5 have characteristics suitable for a wide-band ¼ wave plate and are prepared in the form of a thin film having a thickness of 30 μm level. Moreover, the fluorene ring-containing polyester and the polyamide resin forming the retardation films of Examples 1 to 5 have a relatively high Tg and also have an excellent heat resistance (environmental reliability). In particular, Examples 1 to 4 are preferred from the viewpoint of a thin film having characteristics close to characteristics (Ro(550) of 137.5 nm, Ro(450)/Ro(550) of 0.818) of an ideal wide-band ¼ wave plate. Examples 1, 2 and 4 are more preferred, and Examples 2 and 4 are further preferred.

Examples 6 to 8

For each Example, a multilayer film (a primary film) having a two-kinds three-layer structure including a skin minute) in each stretching direction using a tenter-type stretching apparatus ("IMC-1A97 type" manufactured by Imoto machinery Co., Ltd.) to give a stretched film. Before the stretching, the multilayer film was subjected to a pre-heating treatment for 10 minutes at the same temperature as the stretching temperature. The resulting stretched film had a thickness ratio of each layer equivalent to that in the primary film. Table 2 shows the Ro(450), Ro(550), Ro(450)/Ro(550), and Rth(589) of the resulting stretched film, and the average thickness (total thickness) of the film after the stretching.

TABLE 2

| | Primary film | | | Stretching condition | | Stretched film | | | | |
|---|---|---|---|---|---|---|---|---|---|---|
| | Thickness of skin layers | Thickness of core layer | Total thickness | Temperature | Stretching ratio | Total thickness | In-plane retardation Ro (nm) | | Dispersibility | Rth (nm) |
| | (μm) | (μm) | (μm) | (° C.) | (times) | (μm) | Ro(450) | Ro(550) | Ro (450)/Ro (550) | Rth (589) |
| Example 6 | 130 | 40 | 170 | 137 | 1.8 × 2.4 | 50 | 44 | 51 | 0.863 | 136 |
| Example 7 | | | | 137 | 1.7 × 2.4 | 38 | 50 | 55 | 0.909 | 125 |
| Example 8 | | | | 140 | 1.6 × 2.1 | 40 | 53 | 55 | 0.964 | 105 |

In Table 2, the thickness of the skin layers in the primary film represents the total thickness of two skin layers. The thickness per skin layer is 65 μm. The stretching temperature in the MD and that in the TD are the same temperature. The stretching ratio means the stretching ratio in the longitudinal direction (MD or longitudinal direction of film)×the stretching ratio in the transverse direction (TD or crosswise direction of film).

As apparent from Table 2, the retardation films obtained in Examples 6 to 8 have characteristics suitable for an optical compensation film for a VA-LCD and are prepared in the form of a thin film. In particular, Examples 6 and 7 are preferred from the viewpoint of Ro and Rth being in more preferred ranges.

INDUSTRIAL APPLICABILITY

The retardation film of the present disclosure exhibits an excellent retardation expression and an excellent reciprocal wavelength dispersibility. Thus, the retardation film is producible under a mild stretching condition, is thin and excellent in mechanical strength (or handleability) such as toughness, and has an excellent environmental reliability. The retardation film is thus preferably available for a circularly polarizing plate having an antireflection performance over a wide band and an organic EL display provided with the circularly polarizing plate, as well as a retardation film for a VA-LCD and a vertically aligned liquid crystal display device.

The invention claimed is:

1. A retardation film comprising:
    a polyester-series resin exhibiting a negative orientation birefringence and exhibiting a forward wavelength dispersibility in retardation, and
    a polyamide-series resin exhibiting a positive orientation birefringence and exhibiting a flat dispersibility in retardation,
    wherein the polyester-series resin and the polyamide-series resin have a difference of 0 to 20° C. in glass transition temperature, and
    the retardation film is a laminated film comprising: a first layer containing the polyester-series resin, and a second layer containing the polyamide-series resin.

2. The retardation film according to claim 1, wherein the polyester-series resin contains a constitutional unit having a fluorene-9,9-diyl group, and the polyamide-series resin contains a constitutional unit having an alicyclic skeleton.

3. The retardation film according to claim 1, wherein the polyester-series resin contains, as a constitutional unit having a fluorene-9,9-diyl group, at least one constitutional unit selected from the group consisting of a fluorenedicarboxylic acid unit (A1) and a fluorenediol unit (B1), and the fluorenedicarboxylic acid unit (A1) contains a dicarboxylic acid unit represented by the following formula (1):

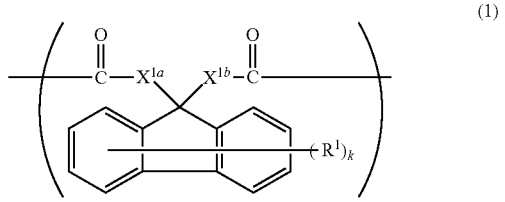

wherein $R^1$ represents a substituent, k denotes an integer of 0 to 8, and $X^{1a}$ and $X^{1b}$ independently represent a divalent hydrocarbon group which may have a substituent, and the fluorenediol unit (B1) contains a diol unit represented by the following formula (2):

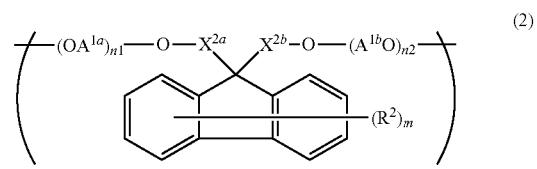

wherein $R^2$ represents a substituent, m denotes an integer of 0 to 8, $X^{2a}$ and $X^{2b}$ independently represent a divalent hydrocarbon group which may have a substituent, $A^{1a}$ and $A^{1b}$ independently represent a straight- or branched-chain alkylene group, and n1 and n2 each denote an integer of not less than 0.

4. The retardation film according to claim 3, wherein the fluorenediol unit (B1) contains a diol unit represented by the following formula (2A):

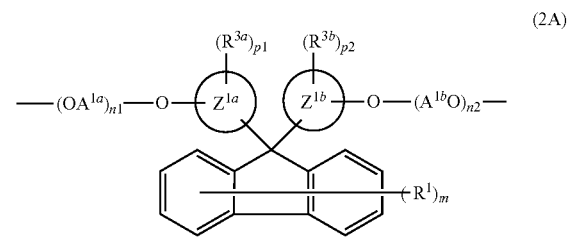

wherein $Z^{1a}$ and $Z^{1b}$ independently represent an arene ring, $R^{3a}$ and $R^{3b}$ independently represent a substituent, p1 and p2 independently denote an integer of not less than 0, and $R^2$, m, $A^{1a}$ and $A^{1b}$, n1 and n2 each have the same meaning as defined in the formula (2) recited in claim 3.

5. The retardation film according to claim 4, wherein the polyester-series resin contains a (poly)alkylene glycol unit (B2) represented by the following formula (3):

wherein $A^2$ represents a straight- or branched-chain alkylene group, and q denotes an integer of not less than 1.

6. The retardation film according to claim 5, wherein, in the polyester-series resin,
    $X^{1a}$ and $X^{1b}$ each represent a straight- or branched-chain $C_{2-4}$ alkylene group in the formula (1),
    $Z^{1a}$ and $Z^{1b}$ each represent a $C_{6-12}$ arene ring, $R^{3a}$ and $R^{3b}$ each represent a $C_{1-4}$ alkyl group or a $C_{6-10}$ aryl group, p1 and p2 each denote an integer of 0 to 2, $A^{1a}$ and $A^{1b}$ each represent a straight- or branched-chain $C_{2-4}$ alkylene group, and n1 and n2 each denote an integer of 0 to 2 in the formula (2A), and
    $A^2$ represents a straight- or branched-chain $C_{2-4}$ alkylene group, and q denotes an integer of 1 to 4 in the formula (3).

7. The retardation film according to claim 1, wherein the polyamide-series resin contains a diamine unit represented by the following formula (4):

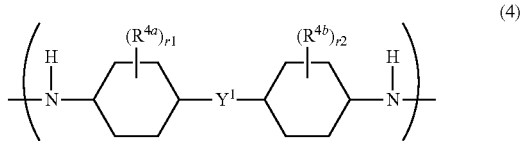

wherein $Y^1$ represents a direct bond, or a divalent hydrocarbon group which may have a substituent, $R^{4a}$ and $R^{4b}$ independently represent a substituent, and r1 and r2 independently denote an integer of 0 to 4.

8. The retardation film according to claim 7, wherein the polyamide-series resin contains a constitutional unit derived from an aliphatic dicarboxylic acid component.

9. The retardation film according to claim 8, wherein the polyamide-series resin contains:

a diamine unit represented by the formula (4) in which $Y^1$ represents a $C_{1-4}$ alkylene group, $R^{4a}$ and $R^{4b}$ each represent a $C_{1-4}$ alkyl group, and r1 and r2 each denote 0 or 1, and a constitutional unit derived from a straight- or branched-chain $C_{4-16}$ alkane-dicarboxylic acid component.

10. The retardation film according to claim 1, which is a laminated film having a three-layer structure comprising the first layers laminated on both sides of the second layer.

11. The retardation film according to claim 1, wherein a ratio of a total thickness of the first layer relative to a total thickness of the second layer is 1/1 to 10/1 in terms of the former/the latter.

12. The retardation film according to claim 1, which has a thickness of 20 to 70 μm.

13. The retardation film according to claim 1, which is a uniaxially stretched film or a biaxially stretched film.

14. The retardation film according to claim 13, wherein Ro(550) is 100 to 160 nm and a ratio Ro(450)/Ro(550) is not less than 0.7 and less than 1, wherein Ro(λ) represents an in-plane retardation at a wavelength of 2 nm, and which is a ¼ wave plate.

15. The retardation film according to claim 13, wherein Ro(550) is 30 to 50 nm, a ratio Ro(450)/Ro(550) is not less than 0.7 and less than 1, and Rth(589) is 120 to 140 nm, wherein Ro(λ) represents an in-plane retardation at a wavelength of 2 nm and Rth(2) represents a thickness-direction retardation at a wavelength of 2 nm, and wherein the retardation film is an optical compensation film for a vertically aligned liquid crystal display.

16. A polarizing plate comprising a retardation film recited in claim 1.

17. An image display device comprising a polarizing plate recited in claim 16.

18. The image display device according to claim 17, which is an organic electroluminescent (EL) display or a vertically aligned liquid crystal display.

* * * * *